(12) United States Patent
Bassi et al.

(10) Patent No.: US 10,137,836 B2
(45) Date of Patent: Nov. 27, 2018

(54) VEHICLE VISION SYSTEM

(71) Applicant: GEO SEMICONDUCTOR INC., San Jose, CA (US)

(72) Inventors: Zorawar S. Bassi, Markham (CA); Ashkan Alavi-Harati, Richmond Hill (CA); Thushyanthan Jegatheswaran, Scarborough (CA); Edmund Tam, Markham (CA)

(73) Assignee: GEO SEMICONDUCTOR INC., San Jose, CA (US)

( * ) Notice: Subject to any disclaimer, the term of this patent is extended or adjusted under 35 U.S.C. 154(b) by 0 days.

(21) Appl. No.: 15/489,069

(22) Filed: Apr. 17, 2017

(65) Prior Publication Data

US 2017/0232896 A1    Aug. 17, 2017

Related U.S. Application Data

(62) Division of application No. 14/742,331, filed on Jun. 17, 2015, now Pat. No. 10,040,394.

(51) Int. Cl.
*B60R 1/00* (2006.01)
*H04N 7/18* (2006.01)
(Continued)

(52) U.S. Cl.
CPC ............ *B60R 1/00* (2013.01); *G02B 27/0101* (2013.01); *H04N 5/23238* (2013.01); *H04N 5/247* (2013.01); *H04N 5/3572* (2013.01); *H04N 7/181* (2013.01); *B60K 2350/106* (2013.01); *B60K 2350/1072* (2013.01); *B60K 2350/1084* (2013.01); *B60K 2350/1088* (2013.01); *B60K 2350/2013* (2013.01); *B60K 2350/2017* (2013.01); *B60K 2350/2052* (2013.01); *B60K 2350/2065* (2013.01); *B60K 2350/2095* (2013.01); *B60K 2350/921* (2013.01);
(Continued)

(58) Field of Classification Search
None
See application file for complete search history.

(56) References Cited

U.S. PATENT DOCUMENTS 5,027,104 A    6/1991  Reid
5,712,679 A    1/1998  Coles
(Continued)

FOREIGN PATENT DOCUMENTS

EP    1 623 875 A1    2/2006
EP    1 065 642 B1    11/2007
(Continued)

OTHER PUBLICATIONS

Written Opinion issued in International Application No. PCT/US16/33892, dated Oct. 6, 2016, 9 pages in English.
(Continued)

*Primary Examiner* — Reza Aghevli
(74) *Attorney, Agent, or Firm* — Sughrue Mion, PLLC

(57) ABSTRACT

Vehicle visual systems are disclosed to produce seamless and uniform surround-view images of the vehicle using a number of Ultra Wide-Angle (UWA) lens cameras and optionally HUD systems. A distributive system architecture wherein individual cameras are capable of performing various image transformations allows a flexible and resource efficient image processing scheme.

28 Claims, 24 Drawing Sheets

(51) Int. Cl.
*H04N 9/09* (2006.01)
*G02B 27/01* (2006.01)
*H04N 5/232* (2006.01)
*H04N 5/247* (2006.01)
*H04N 5/357* (2011.01)

(52) U.S. Cl.
CPC ... *B60R 2300/102* (2013.01); *B60R 2300/105* (2013.01); *B60R 2300/205* (2013.01); *B60R 2300/30* (2013.01); *B60R 2300/304* (2013.01); *B60R 2300/607* (2013.01); *B60R 2300/802* (2013.01); *B60R 2300/806* (2013.01); *B60R 2300/8046* (2013.01); *B60R 2300/8066* (2013.01); *G02B 2027/014* (2013.01); *G02B 2027/0112* (2013.01); *G02B 2027/0138* (2013.01)

(56) References Cited

U.S. PATENT DOCUMENTS

| | | | |
|---|---|---|---|
| 6,424,272 B1 | 7/2002 | Gutta et al. | |
| 7,375,728 B2 | 5/2008 | Donath et al. | |
| 7,511,607 B2 | 3/2009 | Hubbard et al. | |
| 8,081,211 B2 | 12/2011 | Chou et al. | |
| 8,130,271 B2 | 3/2012 | Imamura | |
| 8,325,247 B2 | 12/2012 | Kamiya et al. | |
| 8,400,329 B2 | 3/2013 | Kumagami | |
| 8,542,289 B1* | 9/2013 | McClatchie | H04N 5/247 348/211.11 |
| 8,619,248 B2* | 12/2013 | Bassi | G01M 11/0264 356/127 |
| 9,438,800 B1* | 9/2016 | Kozko | G06T 11/00 |
| 9,855,894 B1* | 1/2018 | Khorasani | B60R 1/00 |
| 2004/0100443 A1 | 5/2004 | Mandelbaum et al. | |
| 2006/0089754 A1 | 4/2006 | Mortenson | |
| 2006/0268131 A1* | 11/2006 | Cutler | G06T 5/008 348/239 |
| 2007/0236364 A1* | 10/2007 | Hubbard | B60Q 9/005 340/932.2 |
| 2008/0159594 A1 | 7/2008 | Chiu et al. | |
| 2008/0204556 A1 | 8/2008 | de Miranda et al. | |
| 2008/0303913 A1* | 12/2008 | Mertens | H04N 5/232 348/222.1 |
| 2010/0253601 A1* | 10/2010 | Seder | G01S 13/723 345/7 |
| 2013/0197110 A1 | 8/2013 | Fedurco | |
| 2014/0085409 A1 | 3/2014 | Zhang et al. | |
| 2014/0098229 A1 | 4/2014 | Lu et al. | |
| 2014/0118551 A1* | 5/2014 | Ikeda | B60R 1/00 348/148 |
| 2014/0240313 A1 | 8/2014 | Varga | |
| 2014/0247358 A1* | 9/2014 | Takeda | G06T 5/006 348/148 |
| 2014/0267941 A1 | 9/2014 | Ellsworth | |
| 2014/0327775 A1 | 11/2014 | Cho | |
| 2014/0368606 A1* | 12/2014 | Bassi | G06T 3/0062 348/36 |
| 2015/0085083 A1* | 3/2015 | Chen | H04N 13/296 348/49 |
| 2015/0160539 A1* | 6/2015 | Bassi | G06T 7/80 353/69 |
| 2015/0286878 A1* | 10/2015 | Molin | G06K 9/20 348/148 |
| 2015/0294166 A1* | 10/2015 | Kuehnle | G06K 9/00805 701/70 |
| 2016/0021288 A1* | 1/2016 | Chen | H04N 7/183 348/148 |
| 2016/0062121 A1* | 3/2016 | Border | G02B 27/0172 359/630 |
| 2016/0176342 A1* | 6/2016 | Yang | B60R 1/00 348/148 |
| 2016/0297362 A1* | 10/2016 | Tijerina | H04N 7/181 |
| 2016/0368417 A1* | 12/2016 | Bassi | H04N 5/3572 |
| 2017/0050564 A1* | 2/2017 | Lv | B60K 35/00 |

FOREIGN PATENT DOCUMENTS

| | | |
|---|---|---|
| EP | 2 464 113 A1 | 6/2012 |
| WO | 2014204794 A1 | 12/2014 |

OTHER PUBLICATIONS

International Search Report issued in corresponding International Application No. PCT/US16/33892, dated Oct. 6, 2016, 4 pages in English.

C. Hughes et al., "Wide-angle camera technology for automotive applications: a review", IET Intell. Transp. Syst., 2009, pp. 19-31, vol. 3, No. 1.

\* cited by examiner

Front View
622

Rear View
624

Left View
626

Right View
628

Front View
632

Rear View
634

Left View
636

Right View
638

Bird's-Eye View 650

VEHICLE VISION SYSTEM

This application is a divisional of U.S. application Ser. No. 14/742,331, filed Jun. 17, 2015, which is incorporated herein by reference in its entirety.

FIELD

The embodiments described herein relate generally to driver assist vision systems, and particularly to creating surround views using ultra wide-angle lens cameras and HUDs.

BACKGROUND

There has been an explosion of employing visual assist technologies in automotive application in recent years. Cameras are now common features in vehicles to assist drivers in performing their tasks. Furthermore, an integrated visual system would be essential in advancements of autonomous vehicles. Accordingly, there is an increasing need to improve vehicle visual systems for seamless display of the surroundings in real-time; to optimize image analytics and decision making processes; and to minimize time and efforts required for maintenance and calibration of the visual systems.

Exploiting Ultra Wide-Angle (UWA) lenses, having Field of Views (FOV) of at least 180°, may be part of a solution for these challenges when they are complimented with image and video processing capabilities. A powerful image and video processor could provide fast and flexible processing of the acquired images. Further, it could eliminate installment of expensive and bulky optics in the vehicle. Yet further, adaptive transformations may enable the driver or other passengers (collectively referred to as the users) to select areas of interest to view and receive a distortion corrected image in real-time. The co-pending patent application PCT/US2012/027189 teaches an innovative method for unfolding images acquired by Wide-Angle (WA) and Ultra Wide-Angle lenses. The disclosed techniques are based on specialized transformations, including a Zero-Content-Loss (ZCL) transformation that may be applied to the visually distorted images captured through a UWA lens. Accordingly, a perspective corrected image may be obtained with a high degree of accuracy for areas of interest, yet all the information contained in the original captured scene is maintained. A localized and content adaptive correction may further be applied to selected regions of interest.

The present invention discloses novel vehicle vision system architectures and methods of implementation based on proprietary image processing means. A full rear and peripheral view input may be provided with minimum number of cameras, where ZCL imagery guarantees no blind spots for the driver. Optionally and preferably, adding a front camera may provide a 360° image acquisition capability. Such a multi-camera (also referred to as MC from here on) systems may realize various innovations in the automotive industry. For example, the rear-view and/or side-view mirrors and the task of adjusting them, either manually or electrically may be replaced by a minimum number of smart cameras. Alternatively, one could envision operating a mirror-less vehicle where all mirrors are replaced by displays. The latter would be essential for autonomous driving where decision makings would be done by the machine instead of the driver. Further, such visual systems may be integrated with alarm systems, tracking systems, communication systems, etc. to facilitate more features such as recording and communicating the events on the road.

In a vision system, equally as important as the capture devices, are the display devices. That may be one or more LCD displays, one or more projectors, one or more Head-Up-Displays (HUDs), or some combination of them. An issue with LCD displays may be their physical positioning and plane of focus that are necessarily away from the driver's front field of view and road focused focal point. This means looking away and changing focus in order to see the LCD display, which can potentially be very dangerous, even if the distraction lasts only a few seconds. For these reasons, we are seeing rapid growth of HUD displays for vehicles, which present information in the form of a virtual image displayed a few meters in front of the driver, avoiding having to look away or lose focus. The image is also appropriately positioned not to obstruct the normal view. Because HUD displays are based on projection optics, and the windshield functions in itself as an optical element, this leads to various geometric distortions. Just as a processor corrects for distortion of an UWA lens, the same type of processor can correct for distortions on the display side for a HUD. These corrections may be combined with any user specific corrections for customization of their view. Furthermore, analogous to multiple cameras, multiple displays (HUDs and LCD displays) may be used to present information in novel ways, that are more natural to the driver experience. Multiple HUD displays may be blended and stitched together to provide large view displays that can be very useful for applications such as augmented reality for safety, highlighting objects, displaying map information or even detailed graphics/video content when the vehicle is in park, etc. A 360° view discussed above may be presented on a large view HUD made from two or more smaller HUDs in sufficient detail and correct perspective. Combining multiple HUD displays into single novel views also requires geometric correction, which can be facilitated by the same processor used for correcting single HUD distortions. The present invention as part of its vision system includes multiple display systems, functioning independently or jointly, to present novel sophisticated views to the driver. All prior art vision based systems have solely focused on the capture process, with no consideration of the display side.

This invention benefits teachings of the co-pending application PCT/US2012/027189; the content of which are incorporated by reference in their entirety. All methods and transformations may be implemented by software or in real-time using proprietary hardware implementation of the transformations, for example as described in U.S. Pat. Nos. 7,324,706 and 8,055,070. The system architectures are embodied in a vehicle environment but may be applicable to other environments with similar video capture and display settings.

SUMMARY

The embodiments described herein provide in one aspect, a vehicle vision system comprising:
a plurality of Ultra Wide-Angle (UWA) lens cameras mounted on a plurality of sides of a vehicle, each camera providing a corresponding UWA feed, wherein each camera comprises a Geometry and Color processing (GCP) unit that is configured to pre-process the corresponding UWA feed for a seamless surround-view image construction; a central logic configured to combine the pre-processed UWA feeds and output a surround-view image of the vehicle; and at least one display unit to display at least one of the surround-view output image, one or more of the UWA feeds, and one or more of the pre-processed UWA feeds.

The embodiments described herein provide in another aspect a vehicle vision system comprising: a plurality of Ultra Wide-Angle (UWA) lens cameras mounted on a plurality of sides of a vehicle, each camera providing a corresponding UWA feed; at least one HUD comprising a geometry and color processing unit, wherein the at least one HUD is configured to receive at least one UWA feed and pre-process the at least one UWA feed for a seamless surround-view image construction; and a central logic configured to combine the pre-processed UWA feeds and output a seamless surround-view image of the vehicle; wherein at least one of the surround-view output image, one or more of the UWA feeds, and one or more of the transformed UWA feeds are projected on a virtual surface in front of windshield of the vehicle by the at least one HUD.

The embodiments described herein provide in another aspect a method for producing a seamless surround-view image of a vehicle, said method comprising: pre-processing a plurality of Ultra Wide-Angle (UWA) feeds captured by a corresponding plurality of UWA lens cameras mounted on a plurality of sides of the vehicle, wherein each camera comprises a Geometry and Color Processing (GCP) unit; combining the pre-processed UWA feeds using a central logic to output the seamless surround-view image of the vehicle; and displaying at least one of the surround-view output image, one or more of the UWA feeds, and one or more of the pre-processed UWA feeds.

The embodiments described herein provide in another aspect a method for displaying a surround-view image of a vehicle, said method comprising: receiving a plurality of Ultra Wide-Angle (UWA) feeds, captured by a corresponding plurality of UWA lens cameras mounted on a plurality of sides of the vehicle, by at least one Head-UP-Display (HUD) comprising a Geometry and Color Processing (GCP) unit; pre-processing the plurality of received Ultra Wide-Angle (UWA) feeds for a seamless surround-view image construction by the at least one HUD; combining the pre-processed UWA feeds using a central logic to output the surround-view image of the vehicle; and projecting at least one of the surround-view output image, one or more of the UWA feeds, and one or more of the pre-processed UWA feeds through at least one Head-UP-Display (HUD).

BRIEF DESCRIPTION OF THE DRAWINGS

For a better understanding of the embodiments and/or related implementations described herein and to show more clearly how they may be carried into effect, reference will now be made, by way of example only, to the accompanying drawings which show at least one exemplary embodiment and/or related implementation in which.

Figure 1:
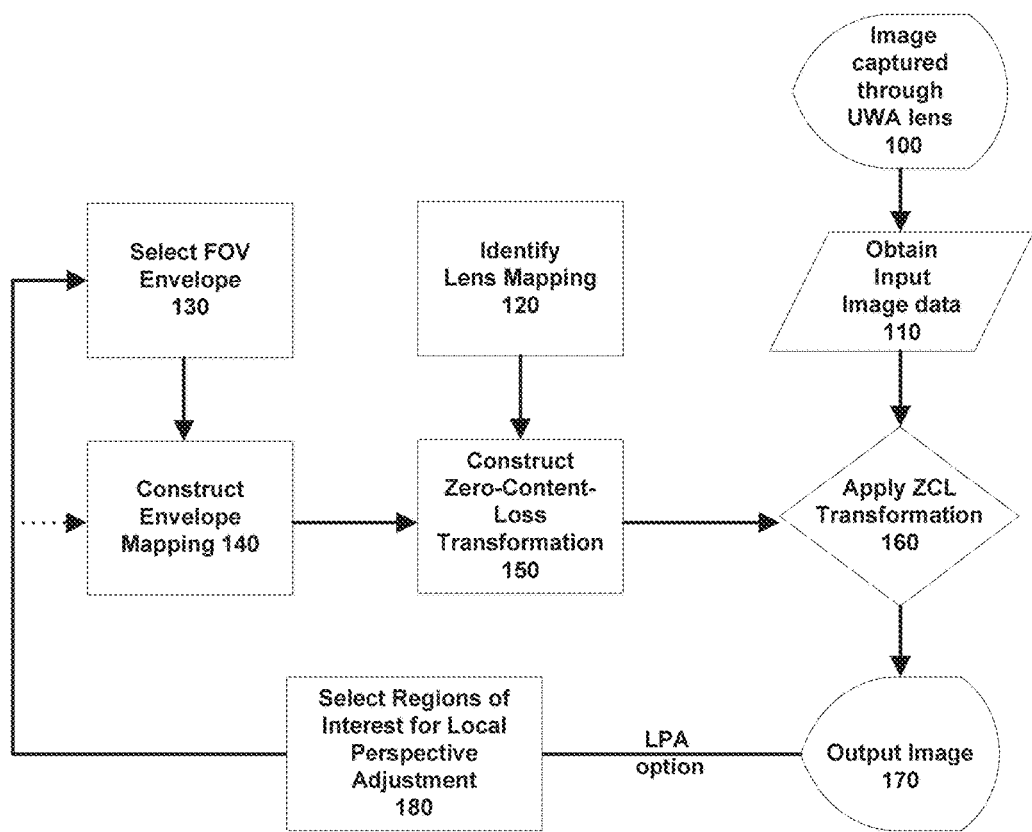
FIG. 1 illustrates a method, incorporated by reference, for applying a zero-content-loss transformation to an image acquired by a UWA lens camera.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

It will be appreciated that numerous specific details are set forth in order to provide a thorough understanding of the exemplary embodiments described herein.

However, it will be understood by those of ordinary skill in the art that the embodiments and/or implementations described herein may be practiced without these specific details. In other instances, well-known methods, procedures and components have not been described in detail so as not to obscure the embodiments and/or implementations described herein. Furthermore, this description is not to be considered as limiting the scope of the embodiments described herein, but rather to describe the structure and operation of the various embodiments and/or implementations described herein.

FIG. 1 illustrates an image processing method as taught in the co-pending disclosure, as incorporated by reference, according to which a zero-content-loss (ZCL) transformation may be obtained and applied to an UWA lens input image. An image/video is captured by a capture device that is equipped with a UWA lens 100. The captured image/video is referred to as the input image/feed. Digital capture devices (interchangeably referred to as cameras) are normally equipped with an image sensor, such as a CCD or CMOS, through which the image data 110 may be obtained. The image data 110 comprise spatial and color coordinates of every image pixel of every video frame. In addition, some form of Image and Signal Processor (ISP) is normally embedded in cameras to enable standard functions such as color/brightness/contrast adjustment, white balance, noise reduction, sharpening, etc. Raw UWA images are known to appear curvy and within an oval (circular being a special case) image boundary. This is due to UWA lens mappings, whereby a view from the real world three-dimensional (3D) object space is mapped onto a planer two-dimensional (2D) image space. The lens mapping transformation needs to be identified 120. It may be either provided by the lens manufacturer or modeled mathematically. Alternatively, a more precise and general mapping may be obtained empirically. Next, a 2D surface is selected 130 to fully encompass the FOV of the lens in 3D (i.e. the 2D surface is generally curved). This covering surface is also referred to as the FOV-envelope. A transformation 140 is then constructed to map an output image plane onto the FOV-envelope surface, where every pixel is accounted for, and in such a way that the output image 170 is substantially improved for perspective while all image content is preserved. Hence the ZCL transformation is achieved by concatenating the lens mapping and the FOV-envelope transformation 150, and applying the result to the input image 160. The above approach may also be applied to a multi-camera system. For a Multi-Camera (MC) system, the FOV-envelope may be seen as any surface that fully or partially encompasses the FOV of the full system, which is the union of the individual camera field of views. The extent of the FOV-envelope is determined by the final FOV required for the multi-camera system. For example, in a cylindrical surround view, the FOV-envelope will be a cylinder surrounding the vehicle with a height on the order of the vehicle height. The FOV-envelope may also be disjoint sections of the individual camera FOV-envelopes, if that is the desired view. Often the purpose of multi-camera systems is to stitch views of the different cameras to produce a much larger FOV (up to 360°) than what is available from a single camera. In this case, a stitching envelope may be defined, which is essentially a particular choice of the FOV-envelope to facilitate stitching. The stitching envelope can also be seen as a transformation of the FOV-envelope to a surface that is better suited for stitching. In this manner, all transformations, single or multi-camera, stitched or not, can be viewed as constructing the FOV-envelope 130, followed by the transformation 140 that maps the camera images onto the FOV-envelope, with possible overlapping regions for stitching, which correspond to overlapping FOVs of the individual cameras.

Selection of the FOV-envelope and mapping of the output image to the surface of the FOV-envelope determines the type of view, for example a 360° panoramic view or a perspective view, and the areas selected for display. In particular, parts of the view can have different transformations. Therefore, if local perspective adjustments to the transformations 180 are required, one could re-select the envelope 130 and start over in order to modify the displayed output 170 accordingly. Alternatively, a different envelope transformation 140 can be applied with the same envelope (i.e. no need to alter 130) to tweak the output image. The local adjustments can be performed manually via an operator by selecting one or more areas of interest that need to be corrected, or it could be automated in response to changes in the captured image 180. Additional processing could also be applied to the selected areas, such as zooming in/out, rotation and reflection operations.

Figure 2:
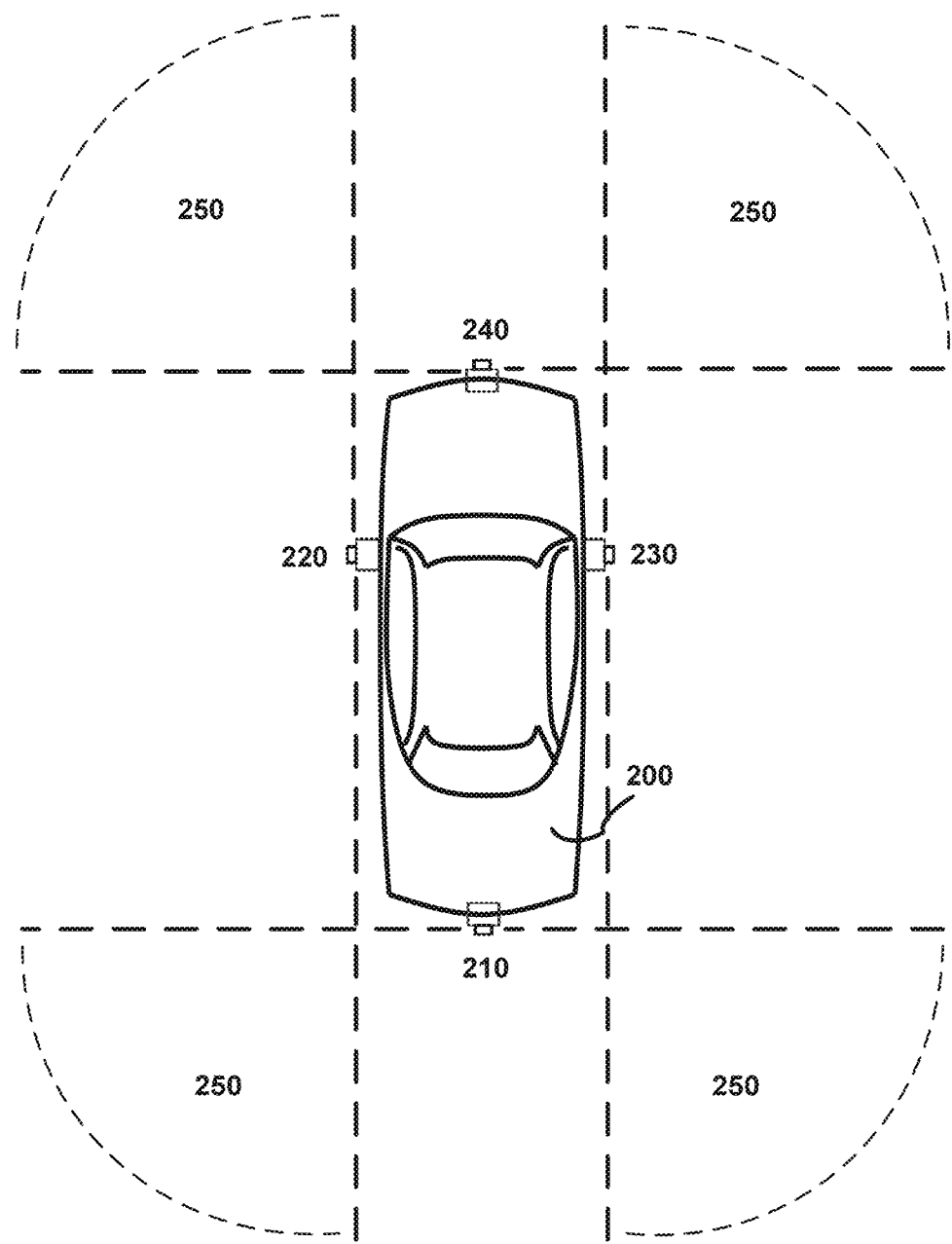
FIG. 2 illustrates a vehicle equipped with a plurality of UWA lens (FOV of 180° in this example) cameras on its sides. The overlapped regions if the cameras are also shown.

FIG. 2 illustrates an exemplary arrangement of a plurality of cameras in a vehicle visual system. At least one UWA lens camera is mounted on each of rear side 210, left side 220 and right side 230 of a vehicle 200. Preferably, another camera may be mounted on the front side 240 of the vehicle to enable the visual system with a full surround-view capability; where surround-view refers to any view that is based on two or more cameras, which often cover a 360 view surrounding the cameras. In the example of FIG. 2, FOV of the cameras are depicted as straight dotted lines covering 180°. Inevitably, there would be overlaps between FOV of the cameras in the four corner regions 250 surrounding the vehicle. For these regions 250 issues of system calibration, camera alignment, and image blending would become crucially important in order to obtain a seamless integrated surround-view. The exact location of the cameras and the spacing between them may be theoretically irrelevant, due to their extensive FOV. However, there are practical considerations. For example, one may choose near the apex of the curvatures on the sides in order to maximize the unblock portion of the field of view. In this case, one may choose to use a UWA with a FOV of slightly larger than 180° in order to compensate for the curvatures and leave no blind spots. Side mirrors and bumpers are other convenient spots for encasing the cameras. A desired view would also determine the orientation and positioning of the cameras. For example, it is more important for a driver to look closer to the curbs and ground rather than looking up in the sky. Hence, the cameras may preferably be tilted or pointed downwards. Other factors such as protecting the cameras from weather elements, collisions, aesthetics, possible hiding of the cameras, etc. should be considered in placing the cameras too. It should be noted that for lengthy vehicles, such as trucks, or if a higher image resolution is needed, more than one camera may be placed on any one side. A skilled person in the art may extend the principles disclosed in this invention to any number of cameras. Four is the minimum number of cameras required to produce a full surround-view of a vehicle and should not be viewed as a limitation.

Although the arrangement of the cameras shown in FIG. 2 enables viewing of a very large field of view horizontally and vertically (at least 180° up-down and right-left), not all angles are of equal interest. Different modes of display may be desired depending on the driving situation. For example, when driving forward, a driver would be mainly interested in what is on the road, ahead, behind and around her, perhaps more or less within a ±45° above and below her line of sight, consistent with a traditional driver viewing experience. Accordingly, a cylindrical mapping may be applied to the FOV-envelope surface 130 to obtain a 360° panoramic all-around-view mode to be displayed for the driver. Unlike the traditional window and mirror based viewing, the resulting image would be free of obstacles and blind spots.

Figure 3:
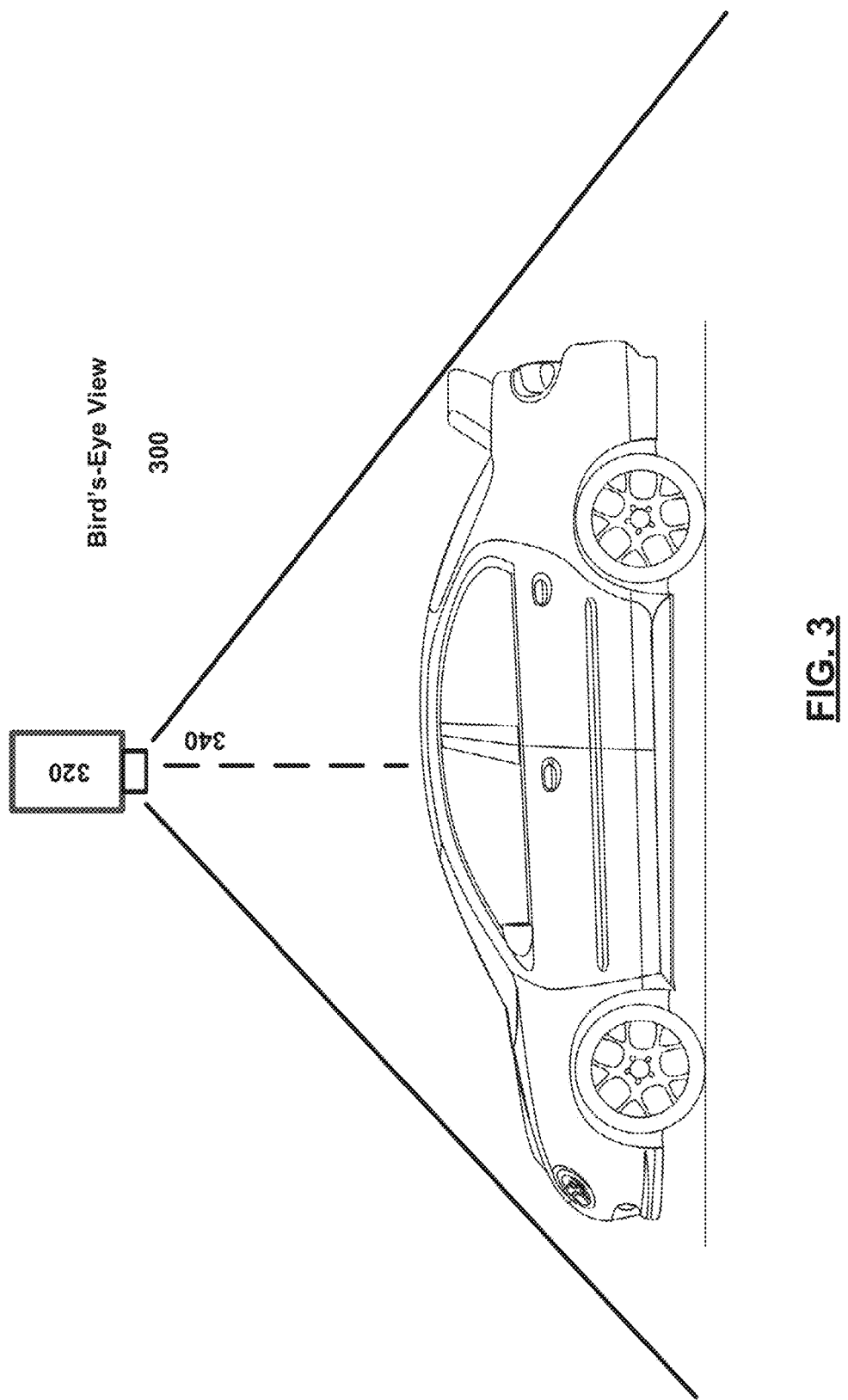
FIG. 3 illustrates a top-down or bird's-eye view of a vehicle as if viewed by an imaginary camera above the vehicle and looking down.

Alternatively, in another mode of operation, as illustrated in the example of FIG. 3, a top-down view or so called Bird's-Eye view 300 may be mapped off the feeds captured from the individual cameras to simulate a surround-view of the vehicle as if captured from a single camera 320 above the vehicle and looking down. It should be noted that the line of sight of the top-down view 340, i.e. orientation of the imaginary camera 320, may be arbitrarily chosen and is not limited to the straight down view as shown in FIG. 3. The top-down display mode would be useful, for instance, during parallel parking, backing up, and driving through narrow alleys.

Generally, displaying output of multi-camera systems can be categorized as either stitched view or non-stitched view. In a stitched view, two or more cameras output are combined to generate a view from the perspective of a virtual camera placed in an arbitrary location. Overlapping between the cameras FOVs is utilized to stitch individual camera feeds. Panoramic and Bird's-eye views, discussed above, are two examples of stitched views. Furthermore, relative orientations of the cameras are required to generate stitched views that can be obtained through geometry calibration.

Figure 4:
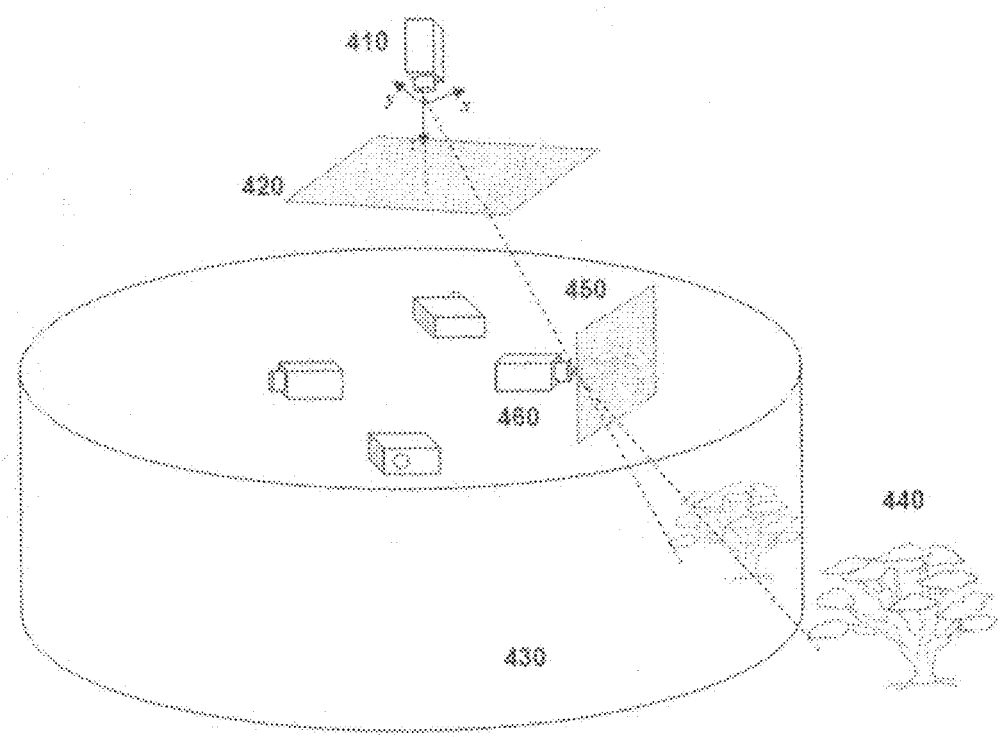
FIG. 4 illustrates an example of constructing a stitched-view from a plurality of views captured by a corresponding plurality of cameras.

Example of FIG. 4 illustrates the steps and concepts involved in generating a stitched-view as if viewed by a virtual camera 410 that is placed at a desired location. The concept of FOV-envelop, mentioned above, naturally extends to a multi-camera system. Here instead of spanning the field of view 450 of an actual camera 460, FOV-envelop 420 would cover the full or part of the field of view of the virtual camera 410. Since the camera 410 is virtual, the field of view spanned by the FOV-envelope 420 could be as large as 360° and may only be limited by the physical placements of actual cameras, their field of views; and/or by the mapping from FOV-envelop to the output. In addition to the FOV-envelop 420, in multi-camera systems, there is also a stitching-envelop 430. The stitching-envelope 430 is a 2D manifold (e.g. a cylindrical surface in this example) where the FOV-envelop 420 is outward mapped to facilitate stitching of content from multiple cameras. Outward mapping onto stitching-envelop 430 may also be guided by the 3D depth information mapping and because of that it may also be a time varying envelop. However, depth information is not always available and therefore the 3D structure of the scene 440 may not be accurately predicted. In such cases, a stitching-envelop is chosen so that its topology closely imitates the assumed scene. One can easily see that these two envelops may easily be integrated into a single envelop. Next, for a given region in the stitching-envelop, the camera 460 that corresponds to that region is identified and the stitching-envelop (or a portion that is relevant to that particular camera) is rotated and translated to bring the stitching-envelop into the selected camera's frame of reference. Finally, with the knowledge of camera forward mapping model, the stitching-envelop is identified with the corresponding pixels in the individual camera output.

In Bird's Eye view mode, the stitching-envelop may be a plane lying on the ground and the FOV-envelop is a perspective plane of the virtual camera. As the driving surface is mostly flat, the topology of the stitching-plane agrees with it. However, when a 3D object appears on the ground and violates the assumption, it causes perspective stretching distortion. To achieve accurate stitching, one also requires obtaining the orientation and placement of the ground relative to the virtual camera. This can be obtained as part of the extrinsic calibration of the Bird's Eye.

In 360°-panoramic view mode, the output is mapped to a cylinder FOV-envelop which is subsequently transformed to another cylindrical stitching-envelop with a bigger radius. Translation between the cameras causes parallax effect in the stitching-envelop. This can be minimized reasonably, for example, by making the radius of the stitching-cylinder considerably larger than the maximum distance among the cameras.

There are a number of challenges in creating a surround-view image from the plurality of input images. First, the plurality of cameras 210, 220, 230, and 240 should be aligned with one another in such a way that objects moving from one camera view to another retain their integrity and shape. One advantage of using UWA lenses is, due to their very large FOV, mechanical alignments may be eliminated. Instead an electronic calibration scheme may be performed once or every once in a while to assure seamlessness and integrity of the resulting output images. Second, the portions of the image extracted from the corresponding cameras generally vary in brightness, sharpness, contrast, and other visual features. A seamless combinatory image requires individual adjustment of color and/or brightness for each camera to make the output image uniform. Third, the image portions should be processed for a seamless blend in the overlapped areas 250, regardless of what imagery scheme is used for the visual system. Various architectures may be designed to achieve a surround-view image construction.

Figure 5A:
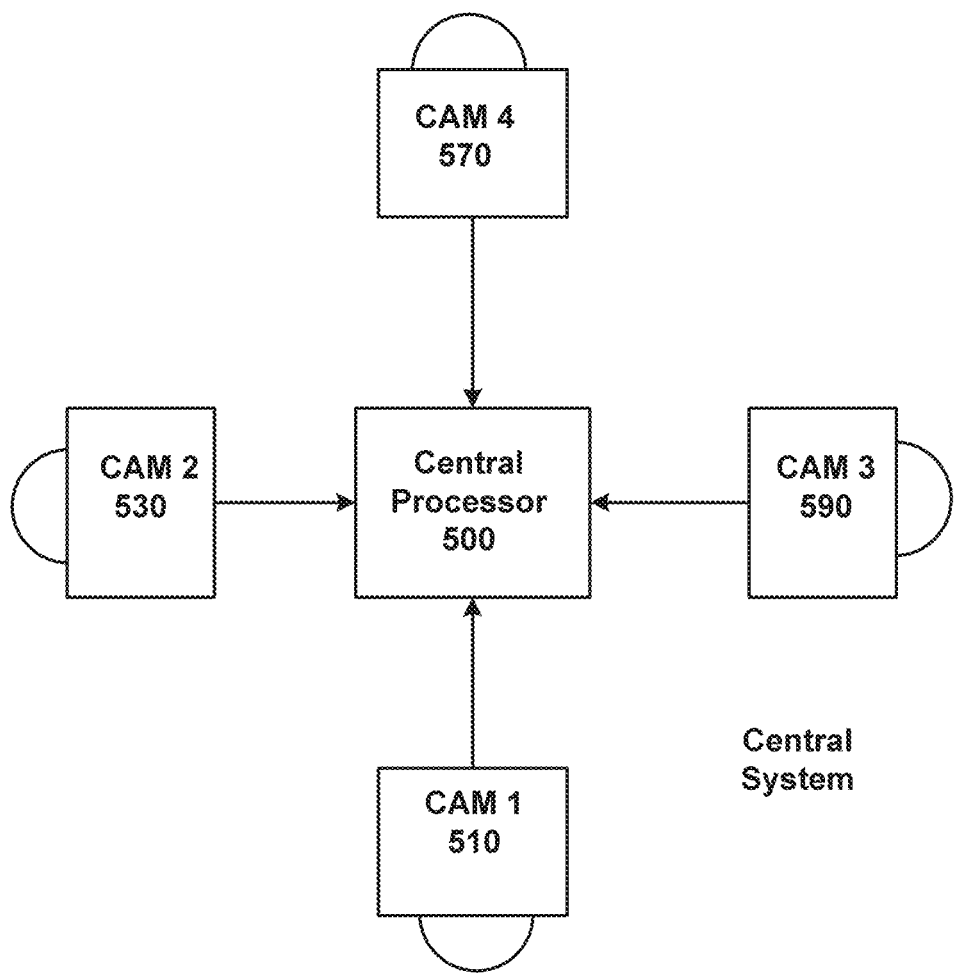
FIG. 5A illustrates a central system architecture for processing multiple inputs from a plurality of cameras.

FIG. 5A conceptually illustrates the more traditional centralized system architecture where a plurality of cameras, e.g. four cameras 510, 530, 570 and 590 in this example, are mounted on four sides of a vehicle. Each camera provides a corresponding feed to a central processor 500. In this configuration the cameras do not need to have more than a basic Image and Signal Processor (ISP), having a limited functionality as far as their image processing capabilities are concerned. In some cases, the ISP may even not be included, instead raw data from the image sensor could be sent to the central processor that will implement all the ISP functions. The feed from each of the cameras are collected by the central processor 500. In such a central configuration, the central processor 500 must include a powerful Geometry and Color Processing (GCP) unit, and possibly even a multi-channel ISP. The central processor 500 collects raw feeds from the individual cameras and performs all the necessary geometry/color transformations, UWA lens image mapping, perspective correction, brightness adjustments, and surround-view image construction. Additionally, multiple input feeds may be processed separately by the central processor 500 for individual display. The proprietary of the centralized systems would therefore mainly be in the central processor 500. Centralized system architecture may be found in various forms in the prior art. It should be noted that the central processor 500 may be more than one physical processing core or even several processing chips, with the distinguishing trait being the processing elements would all be at a distance from the camera, normally by the dashboard controls of the vehicle. The main advantage of this architecture is that the cameras could be simple and inexpensive, particularly useful when greater number of cameras exists in the system. However, since the cameras have a limited or no ISP functionality, the bulk of tasks required for processing and preparing a final surround-view image must be carried out by the central processing unit 500. Most importantly, the individual cameras in this configuration are not capable of de-warping UWA lens raw feeds and performing extreme geometry transformations demanded by users. In order to synthesize a surround-view image, a portion of the final image provided by the corresponding camera should be selected, as per the central processor's command. The portions may be processed and stitched together by the central processor 500 to obtain the final output image. Therefore, the central processor 500 would have a heavy processing duty in this architecture. If it fails, there would be no backup and the entire visual system might shut down. Multiple redundant processors could provide the backup and reduce this effect; however this would lead to a more expensive system. Furthermore, for views which may only require part of the image, the full image still needs to be sent to the central processor, leading to large amounts of data constantly being sent around the vehicle. This high bandwidth becomes a major issue as camera resolutions increase.

Figure 5B:
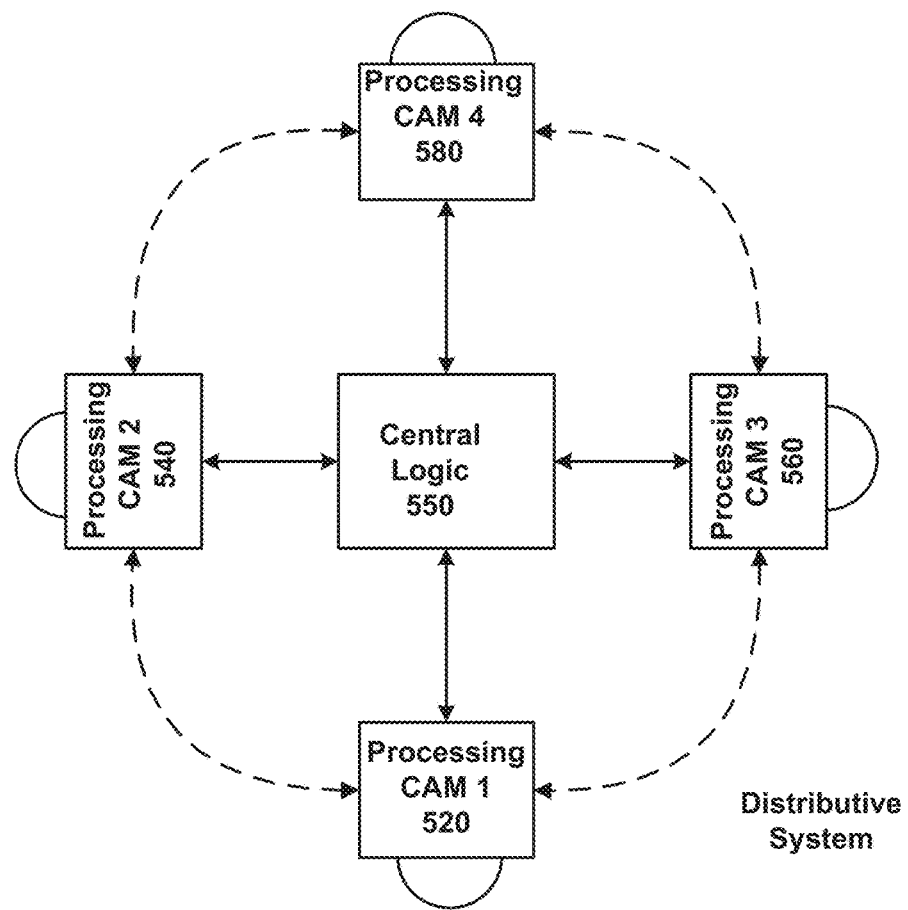
FIG. 5B illustrates a distributive (edge) system architecture for processing multiple inputs from a plurality of cameras.

An alternative architecture is embodied in this invention, an example of which is illustrated in FIG. 5B. Each camera 520, 540, 560 and 580 may be equipped with its own specialized Geometry and Color Processing (GCP) unit in addition to the ISP, collectively referred to as the edge processor (as opposed to a central processor). The GCP and ISP may be physically implemented in the same processor or in two separate processors. In this arrangement, referred to as the edge processing or distributive system, the role of a central processing unit may become minimal or at most equal to the participating cameras. Hence, it is referred to as the central logic 550. Accordingly, individual feeds may be fully pre-processed by the corresponding cameras, either for independent display or in preparation for a combination. The pre-processed portions of the image are provided to the central logic 550 that may simply combine the individually pre-processed feeds pixel-by-pixel. Pre-processing may include one or more of geometry transformation, UWA lens image mapping, perspective correction and color/brightness adjustments. For example, image blending may be achieved by adjusting intensity of the geometrically corrected views in such a way that the overlapped areas would have the same brightness as the non-overlapped areas, when added up together. Although the central logic 550 may be equipped with a similar geometry and color processing unit, its role in the distributive architecture is primarily adding of pixel color values, effectively acting as a combiner.

Essentially, each camera in this configuration becomes a smart camera not only capable of image processing and self calibrating, but also capable of serving as a master to control and manage the other components on performing their processing duties, realizing the concept of edge processing. In the distributive architecture, if one component malfunctions and goes offline, another component may take its place. Therefore, the image processing burden of the central logic 550 may be minimal. According to another embodiment, the central logic 550 is also equipped with the same processing capabilities, in such a way that it would be able to serve as the master too but in equal status as the smart cameras. In a sense, that is a democratic architecture where the smart cameras and optionally the central logic or processing unit may be utilized as a processing master. The cameras may further have direct communication between each other, as shown by the dotted lines, whereby they may query one another for information. For example, uniform color correction may be achieved by one camera looking at color statistics from all cameras, and computing an improved set of color settings, which are then transferred to the respective cameras. Note the physical connection may still be a single wire running to a central point from each camera, however, the central logic does not need to participate in the communication.

Figure 6A:
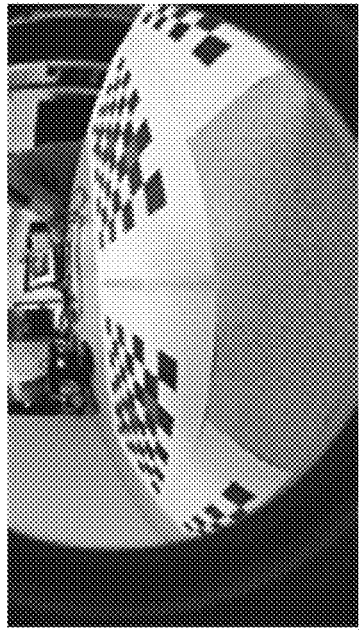
FIGS. 6(A)-6(D) illustrate an example of a top-down view image construction: 6(A) shows four images taken from four UWA lens cameras arranged to capture front, rear, left and right views; 6(B) shows the result of a geometry transformation applied by each of the four cameras to the respective input image to correct for UWA distortion and perspective; 6(C) shows the result of intensity adjustment applied by each of the four cameras to the respective perspective corrected images; and 6(D) shows the resulting top-down surround-view obtained by adding the four images in FIG. 6(C).
Figure 6A:
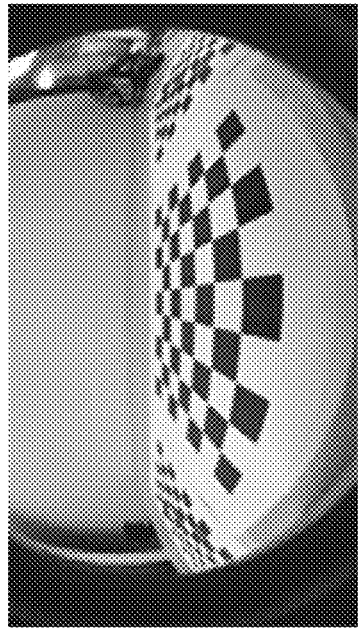
Figure 6A:
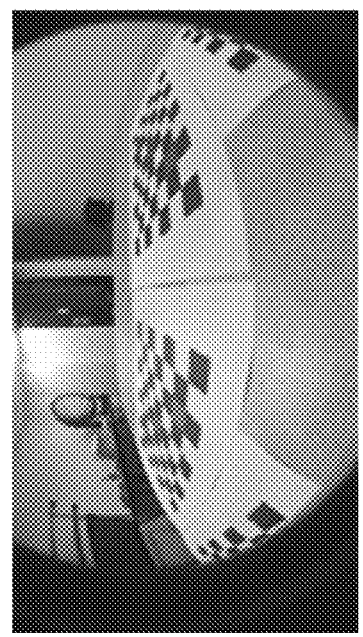
Figure 6A:
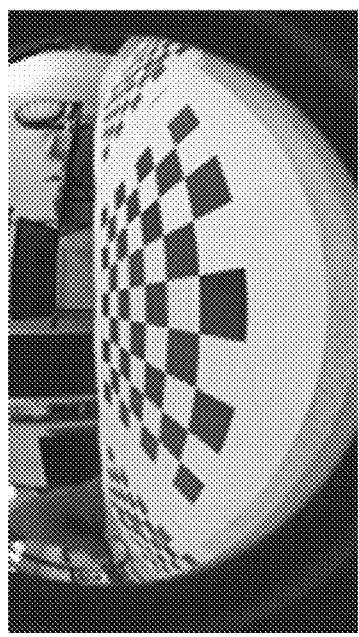
Figure 6B:
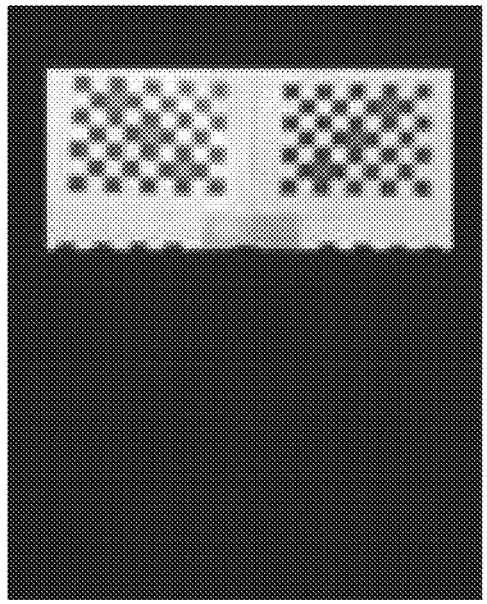
Figure 6B:
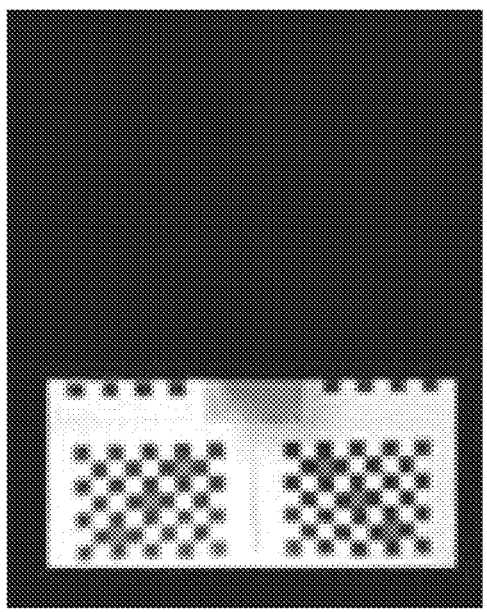
Figure 6B:
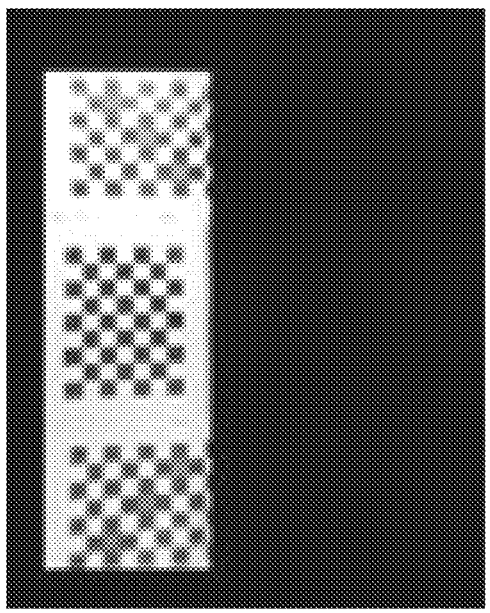
Figure 6B:
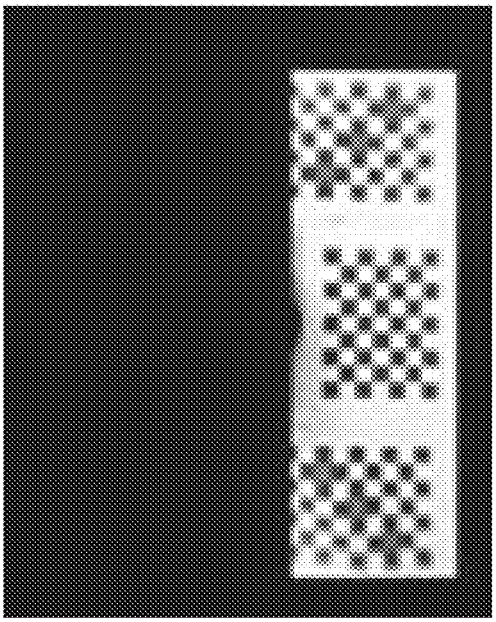
Figure 6C:
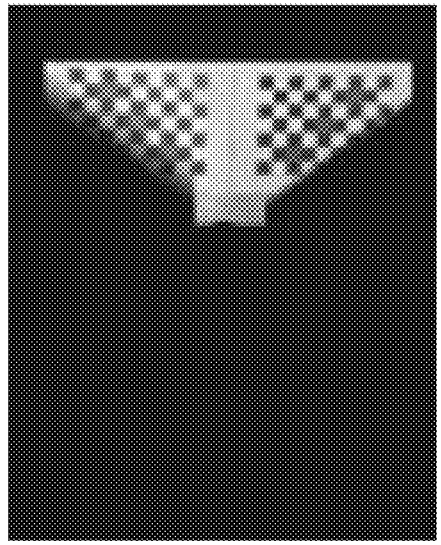
Figure 6C:
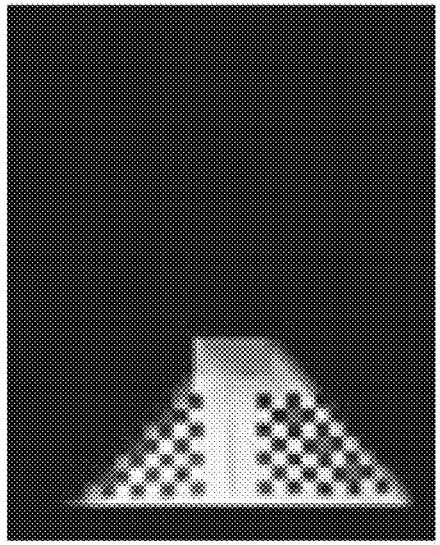
Figure 6C:
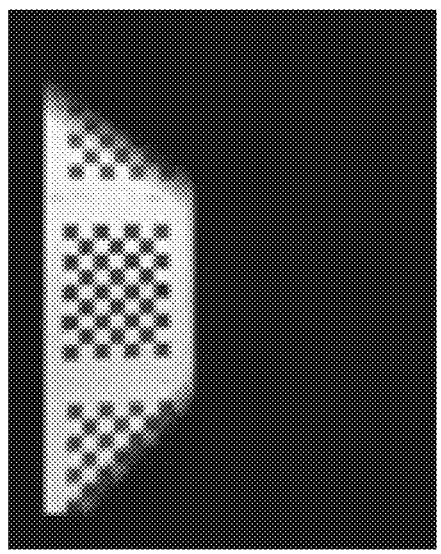
Figure 6C:
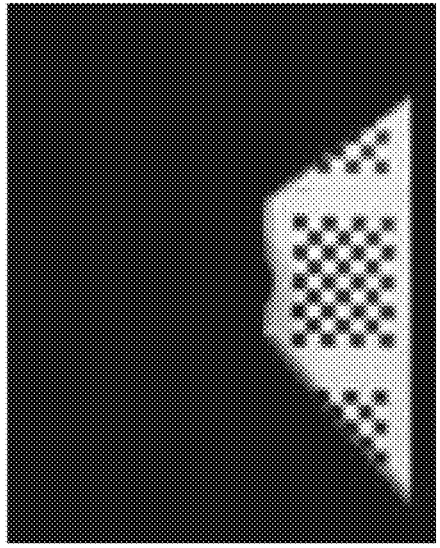
Figure 6D:
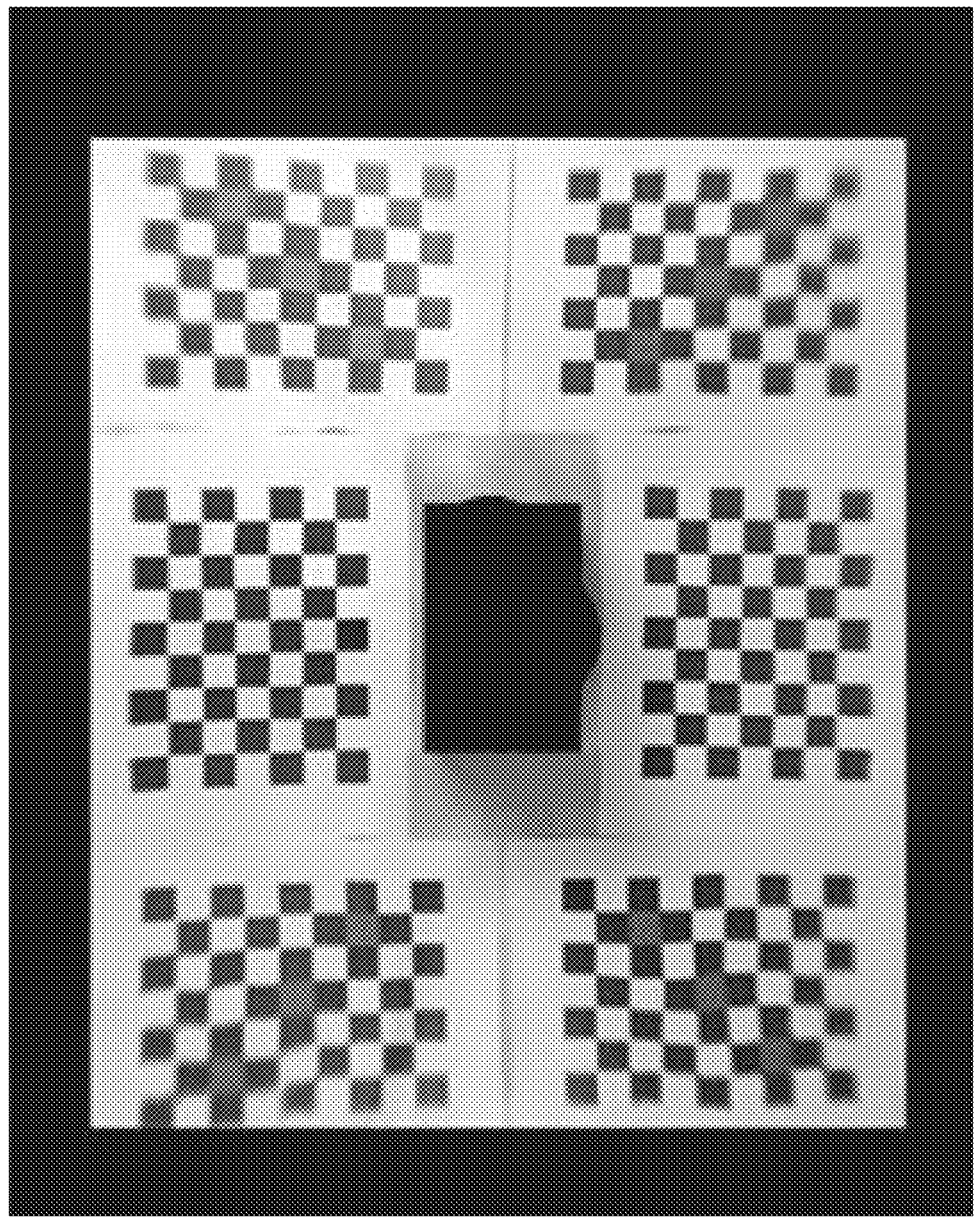

FIGS. 6(A)-6(D) illustrate an example of an edge processing procedure where a 360° surround-view top-down image is created by a distributive system in a lab environment. FIG. 6(A) shows four images taken from four UWA lens cameras arranged as in FIG. 5. The four sides are arbitrarily named Front 612, Rear 614, Left 616 and Right 618 views to be consistent with vehicle terminology of FIG. 2. FIG. 6(B) shows application of an appropriate geometry transformation performed by each camera's GCP unit in such a way that the UWA lens image is mapped for the top-down viewing and the perspective distortion, clearly present in FIG. 6(A), is corrected. At this stage, the four perspective corrected views 622, 624, 626 and 628 are not ready for a pixel-by-pixel addition by the central logic 550. That is due to the overlapped areas (250 in FIG. 2) between images of every two neighboring cameras. The GCP units may further apply a pre-calculated intensity (luminance) adjustment to the geometrically corrected images, such as a gradient shown in FIG. 6(C), required for seamless blending of the adjacent views. Finally, FIG. 6(D) shows the top-down or bird's-eye view 650 obtained by combining the four processed images 632, 634, 636 and 638 of FIG. 6(C). Since the corrective geometry and color transformations are done a priori, the combination task of the central logic 550 could be merely adding pixel color values, e.g. using addition logic.

The display modes may be selected manually by the users. In one embodiment, the vision system further comprises a user interactive medium, so that the driver could select a view as desired. The display modes may also be selected automatically, typically triggered by a function that may signal a change in driving conditions. For example, if a right/left signal is activated, the perspective corrected feeds from the right/left cameras (626 and 628) may be displayed on a single display unit or brought to the center of a multi-display panel. When the gear is changed to reverse, a rear view 624 and/or a bird's-eye view 650 would be more appropriate and may be displayed on a single display unit or brought to the center of multi-display panel automatically. In a distributive approach, the central logic 550 can be a low cost component as opposed to a complicated multi-channel DSP type image processor. Furthermore, the GCP at the edge is a minimal addition to the camera, when using low power and low cost solutions, for instance, as available from Geo Semiconductor Inc. and described for instance in the U.S. Pat. Nos. 7,324,706 and 8,055,070.

Equally as important in a visual system is the display component(s). All real-time visual systems complement their cameras with a component for displaying the constructed surround-view, and optionally individual raw or processed feeds from the cameras. In one example, suggested in prior art, a corrected side view and/or rear view could be displayed on or augmented to the respective side and rear view mirrors. In this approach, a reflective mirror image may be replaced, augmented or alternated with a video stream. The mirrors would not be eliminated, but the images appear in their usual places familiar to the driver. The advantage is that a wider and unobstructed view would be available to the driver. Alternatively, the output image, and optionally the raw input feeds, could be displayed on the vehicle dashboard. LCD/LED displays have been used in prior art. It is also possible to project the output image, e.g. using a DLP projector, on a viewing surface. All these methods of displays may be embodied to the visual system architectures described herein.

Moreover, many vehicles are nowadays equipped with a Head-Up-Display (HUD) unit. A HUD normally comprises one or more projectors that project a virtual image for the driver's view that appears in front of the windshield, in order to reduce distraction of the drivers and keep their focus on the road ahead. Unlike a real image, a virtual image cannot be formed on a screen. It is only viewable by the driver or other passengers in the vehicle or may be captured by a camera. Traditionally, HUDs have been used to display driving related information such as odometer, engine rpm, gas level, etc. However, they can also be configured to display the pre or post processed views streamed from a plurality of cameras attached to the vehicles. Various configurations and implementation of multiple displays in a vehicle vision system will be described next.

Figure 7:
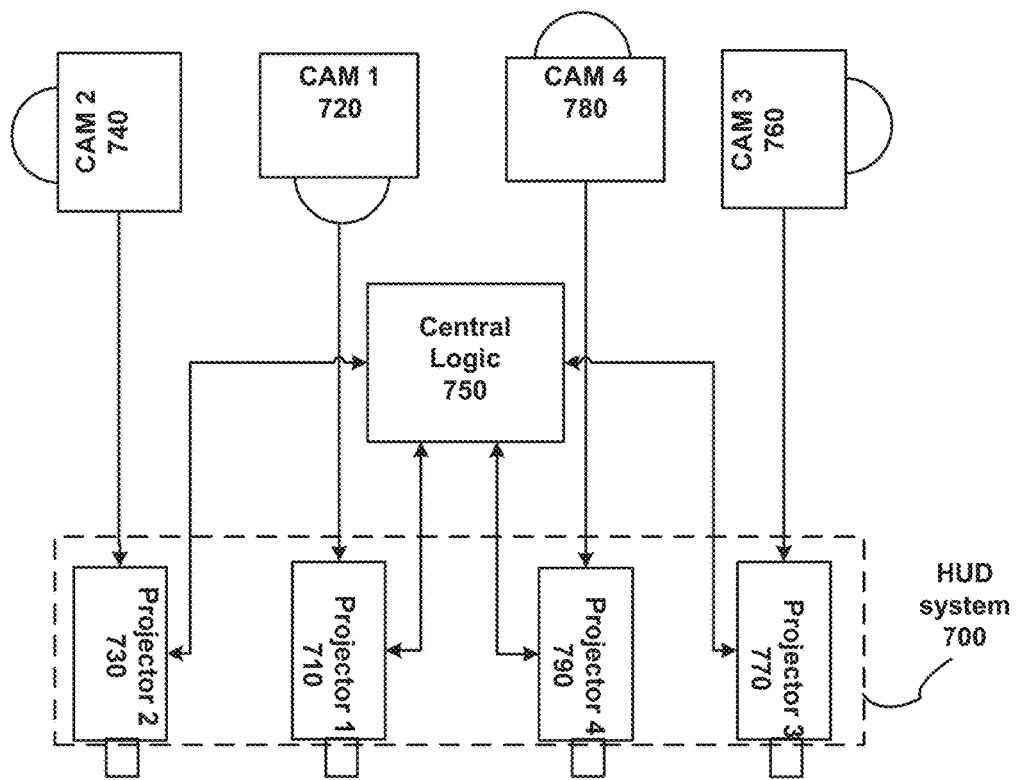
FIG. 7 illustrates a distributive (edge) system architecture for processing multiple inputs from a plurality of cameras and displayed through a corresponding plurality of projectors.

In one exemplary embodiment of the invention, as illustrated in FIG. 7, a special HUD system 700 comprising a plurality of projection elements may be employed to display the output, and optionally the input, images captured by a plurality of cameras. The input feed from each camera 720, 740, 760 and 780 is displayed via a corresponding projector 710, 730, 770 and 790. The multiple projection elements may be mechanically packaged to form a single functional HUD system 700, or the projection elements may be individually packaged into separate HUD systems. In this architecture, the cameras do not need to have a GCP unit. Rather, the geometry and color processing may be performed by GCP units in the projectors. In a HUD, or any projection based system, geometric and color correction also needs to be performed. These corrections are applied for various optical elements in the light path, including the windshield, as well as for mechanical placement (e.g. keystone effect) of the projection units. One or more GCP unit in the HUD may correct for geometry and color distortions of both the cameras and the HUD.

Figure 8A:
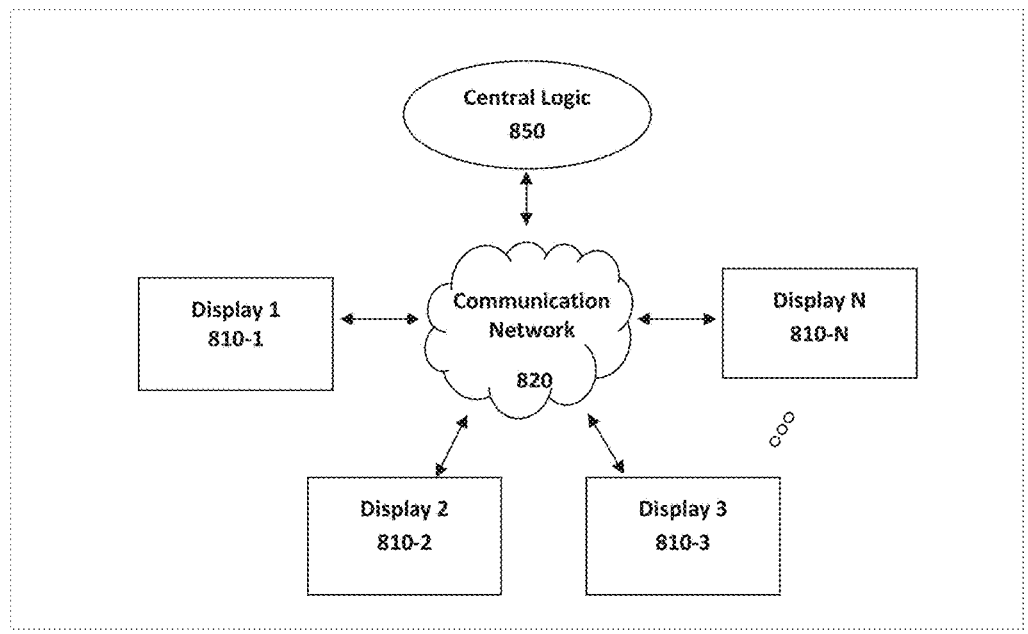
FIG. 8A illustrates a generic architecture for multiple displays that are capable of communicating with each other and with the central logic.

Multiple types of displays may be used in combination with each other to best deliver the information needed to the driver in the context and format best suited for the situation. FIG. 8A shows a generic architecture for multiple displays 810-1 . . . 810-N all capable of communicating with each other as well as the central logic 850 in the vehicle system via a communication network 820. The communication network may be as simple as a wired or wireless connection, such as industry standard 120 connection or Bluetooth, for passing configuration parameters between the displays. These displays include and are not limited to LCDs, projection displays, augmented mirror, etc, and are collectively referred to displays herein in general unless specified. The multiple displays can freely communicate with each other without going through the central logic 850, and the central logic 850 can communicate with all displays.

Figure 8B:
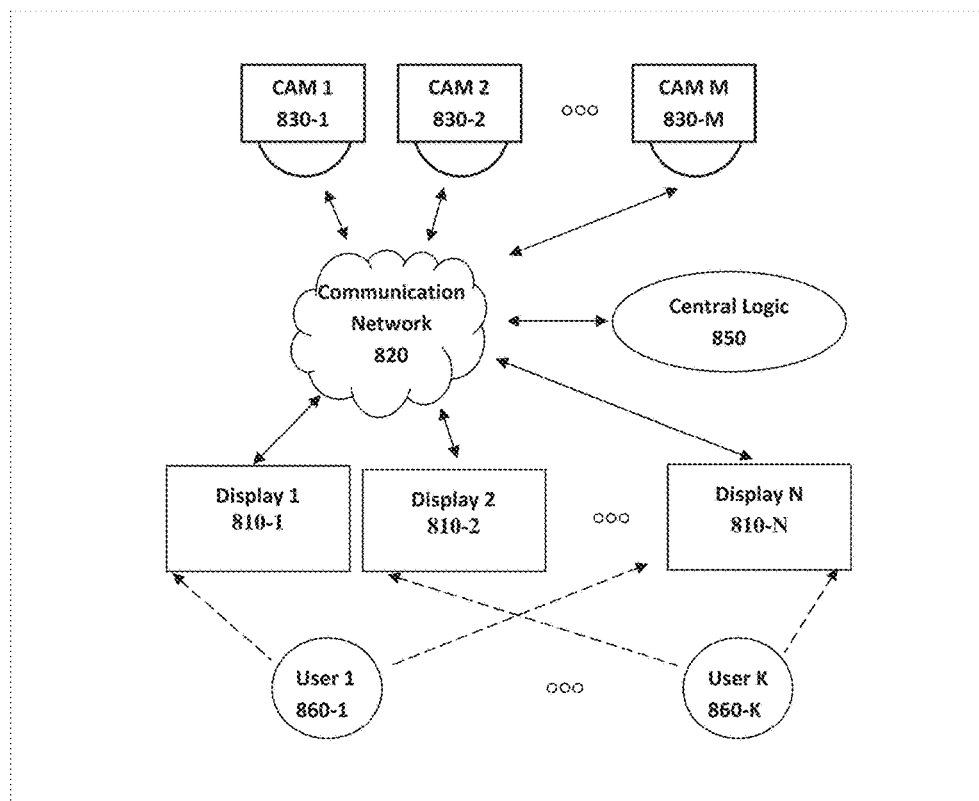
FIG. 8B illustrates an embodiment of the invention, wherein a system comprises a plurality of cameras and displays with distributed (edge) processing capabilities.

FIG. 8B illustrates an embodiment of the invention, showing a full system comprising a plurality of cameras 830-1 . . . 830-M and displays 810-1 . . . 810-N with distributed (edge) processing capabilities to provide information to multiple users 860-1 . . . 860-K. The processing capability includes, but is not limited to, geometry, color, and brightness processing; and could reside in both the cameras 830-1 . . . 830-M and displays 810-1 . . . 810-N, or all within the displays only. The processors in the cameras and displays will allow inter-device communication by forming an ad-hoc communication network 820 in order to coordinate the processing and display effort between the cameras and displays. The division of work could be such that, for example, the cameras 830-1 . . . 830-M will correct for the UWA distortion, and the displays 810-1 . . . 810-N will correct for the distortion of the display surface, or both the UWA and display correction could be performed all by the displays. Through the ad-hoc network 820, the cameras and displays can also leverage each other's processing resources to perform video analytics or other intense computation. Multiple displays of the same type (e.g. all projectors) may be blended together to provide a large viewing surface to show the input combined output from the cameras, or other infotainment content to multiple users. The video feeds from the cameras may be shown on any of the displays, and the driver and the passengers may independently customize the camera views and contents for the displays. All the intensive and high bandwidth processing is distributed in this architecture, and the central logic 850 is allowed to focus on managing other critical vehicle tasks. When there are redundant cameras or displays components, this architecture may also facilitate fault detection and failover in case there is problem with some of the cameras or displays, through communication via the ad-hoc network 820 formed by the distributed processors.

The multiple cameras and multiple displays system in FIG. 8B may also be used to enable fully autonomous self-driving vehicles. For example, the cameras will provide the distortion corrected UWA views required for the vehicle artificial intelligence (AI) to process and navigate the real world autonomously, while the displays can provide the passengers with entertainment and real time vehicle status information of the operation of the autonomous vehicle. When the multiple displays comprise HUDs that project virtual images in front of the driver, this system has additional safety benefits, by keeping the driver focused on the road ahead, in the event there is issue with the autonomous AI and requires falling back to manual human control.

Figure 9:
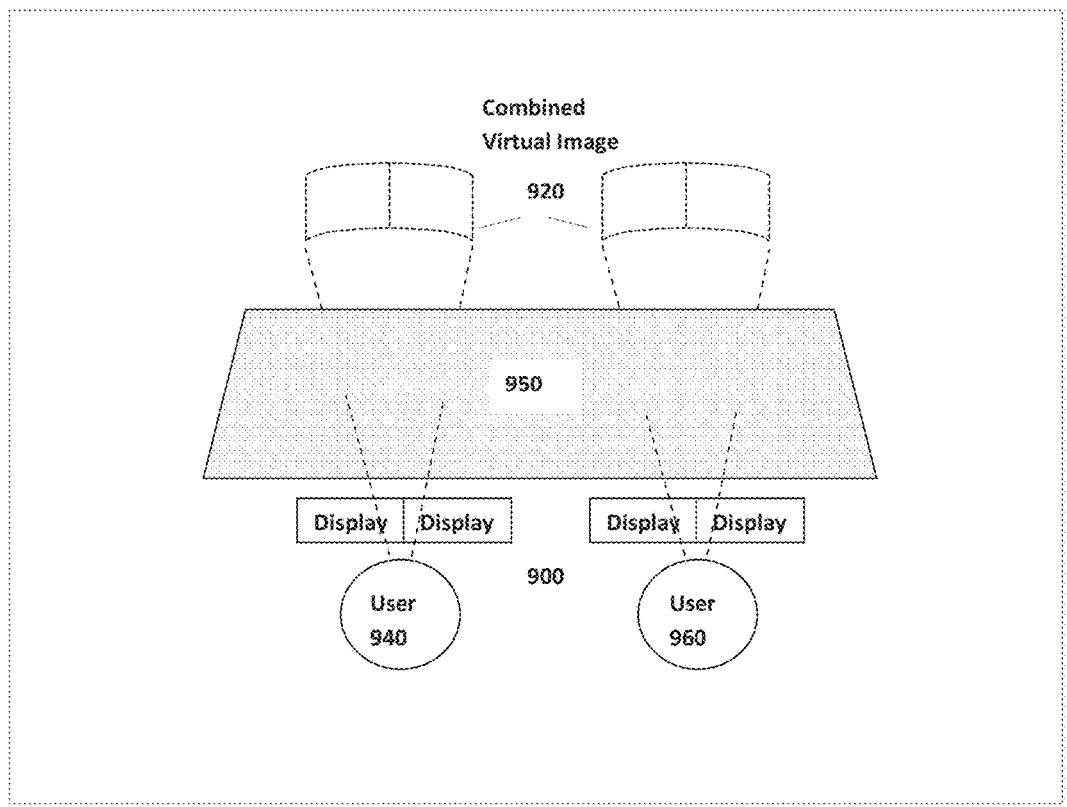
FIG. 9 illustrates an exemplary embodiment of the invention where large virtual images from multiple displays are combined and appear in front of the windshield of a vehicle.

FIG. 9 shows an exemplary implementation of the invention where large combined virtual images 920 from multiple displays 900, for example two or more HUDs, appearing in front of the windshield 950 provide information to the driver 940 and passenger 960. In the fail over situations, the large virtual image from the multiple displays can provide the driver with appropriate alerts or warnings, and the driver will have vision of the road condition beyond the virtual image, thus reducing reaction and accommodation time for taking control of the vehicle manually.

Figure 10:
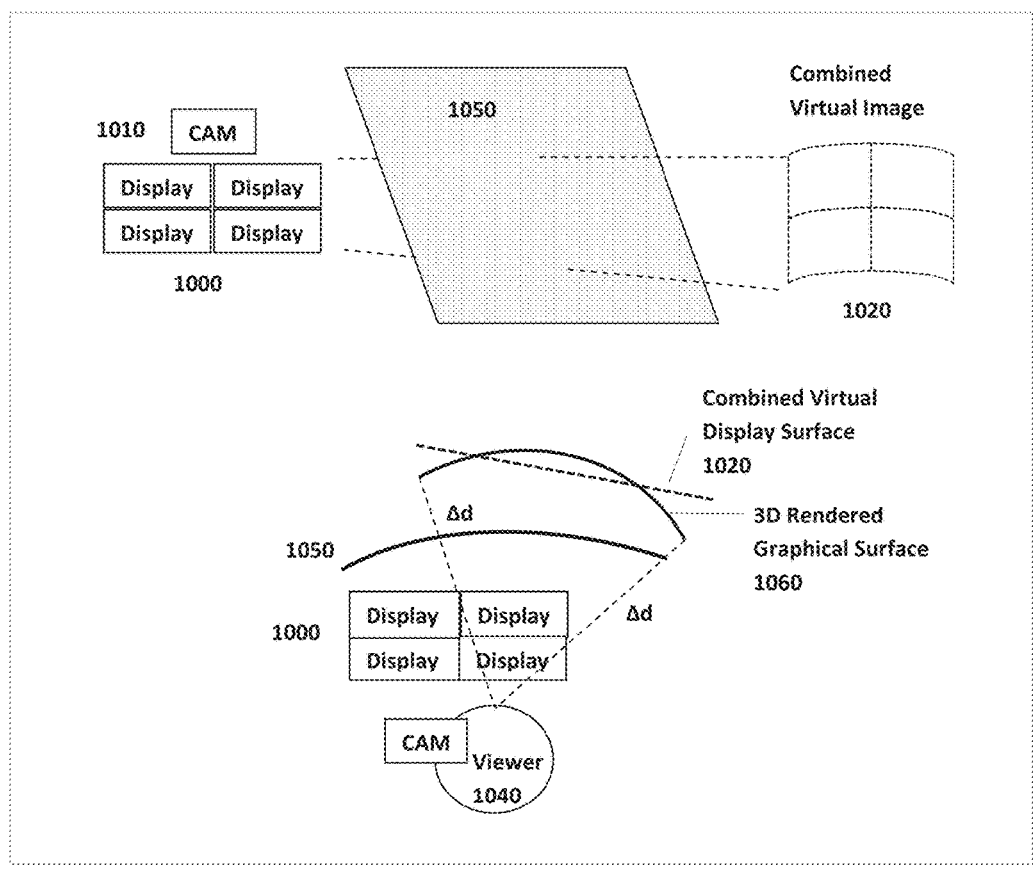
FIG. 10 illustrates an exemplary system of multiple cameras and displays with distributed processors that are capable of calibrating for different windshield surfaces and blend together to form a larger virtual display.

FIG. 10 illustrates a system of multiple cameras and displays 1000 with distributed processors that may correct for different distortions caused by windshield surfaces 1050, and blend individual images together to form a larger virtual display surface 1020. In this configuration, a camera 1010 is interior to the vehicle and seeing the virtual display. For example, the camera 1010 may be integrated with the interior dome light. This system enables the ability to calibrate the displays using the images captured by the cameras, or the stored calibration data for fixed locations on the windshield 1050 can be interpolated for displaying on different windshield locations. The camera feeds may also be used to dynamically adjust the brightness and blending of the combined virtual image 1020 on the displays based on the luminance variation of the virtual image. The individual or combined display surface 1020 could be made into any shape by rendering the content on a 3-dimensional (3D) surface 1060 and is not limited to linear planes. As an example, FIG. 10 shows a combined envelop in the form of a curved surface with the virtual image appearing at equal distance to the viewer as the viewer 1040 pans from left to right. This equal distance viewing surface has the benefit of minimizing the eye's accommodation time as the viewer's field of view pans.

Figure 11:
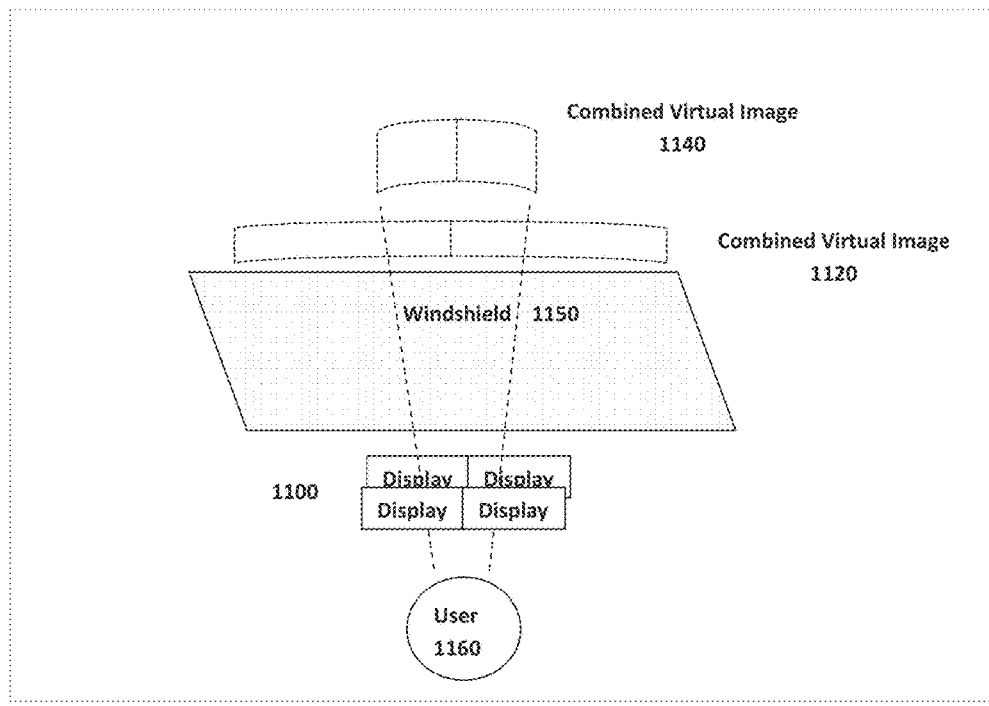
FIG. 11 illustrates a system of multiple displays consisting of a plurality of HUDs that project virtual images at different distances and depths.

FIG. 11 illustrates a system of multiple displays 1100 consisting of HUDs that project virtual images at different distances and depths to give the effect of a 3D volumetric virtual space with layers of information. This is only possible in a vehicle via multiple projection type displays, hence another benefit of having multiple HUDs. Different types of information may be provided at different projected depths or layers to best suit the situation. For example, the dashboard, console, and less critical driving information of the vehicle may be displayed on a layer near the bottom 1120 or sides of the windshield 1150, and the driving critical information can be displayed on another layer in the line of sight 1140 of the driver 1160 like that of a typical HUD. The different depths of the virtual images will require the user's eyes to re-accommodate, which is beneficial in this case so that the less critical layer's information is not in focus when the driver is operating the vehicle. The eye's re-accommodation time and head movement required in such system is also less when compared to looking for information in a traditional dashboard or console system. The depth and layout of the layers may also be controlled or changed depending on the driving mode. For example, when the vehicle is parked the depth of the virtual images could be reduced to bring a larger viewing surface to the user 1160.

Figure 12:
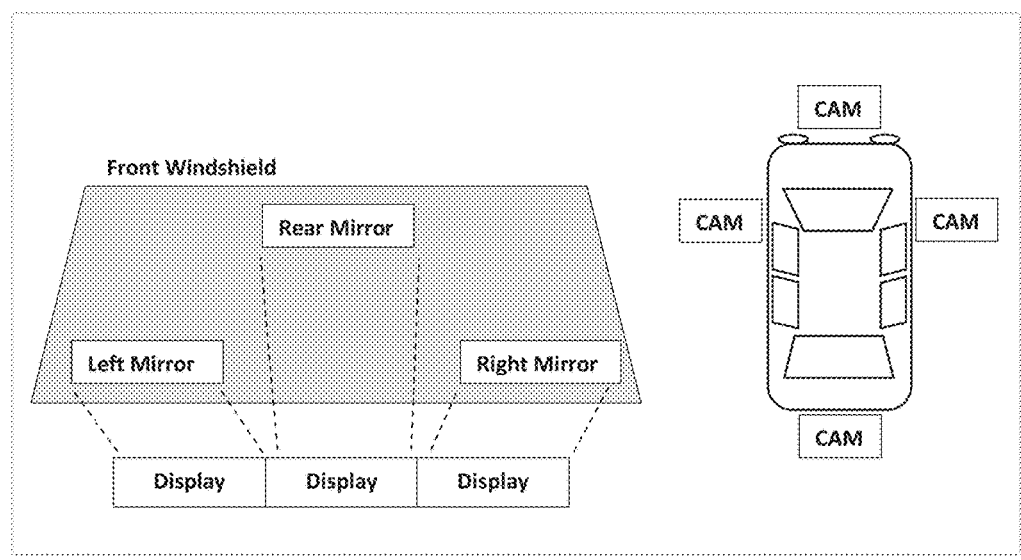
FIG. 12 illustrates an exemplary mirror-less vehicle where a combination of cameras and displays are used to replace the traditional mirrors.

It is envisioned that a mirror-less vehicle may be achieved by using a combination of cameras and displays as illustrated in FIG. 12. According to one embodiment, the function of the side and rear mirrors are replaced with cameras feeds, and the distortion corrected feed from the cameras are shown via multiple displays to the driver. The displays could be LCDs on the dashboard in front of the driver, or HUDs that project virtual side and rear video feed in the view of the driver. This mirror-less system has the benefit that the driver will not have to look away from the road to check for traffic when making lane changes, and the distortion corrected UWA video feeds will capture all the blind spots of the vehicle to provide maximum safety. Additional views like panoramic or surround views can also be presented to enhance the mirror-less driving experience. To facilitate transition to mirror-less vehicle or to provide a fall back option in case there is problem with any of the video feeds, the distortion corrected UWA video feeds can be augmented onto existing mirror locations. This system will provide drivers with blind spot free images on each mirror, and the information is available at the accustomed mirror locations. In the event there is issue with any of the feeds, the UWA feed may be turned off and the driver will still have the ability to use the mirror in a traditional manner to operate the vehicle safely.

Figure 13A:
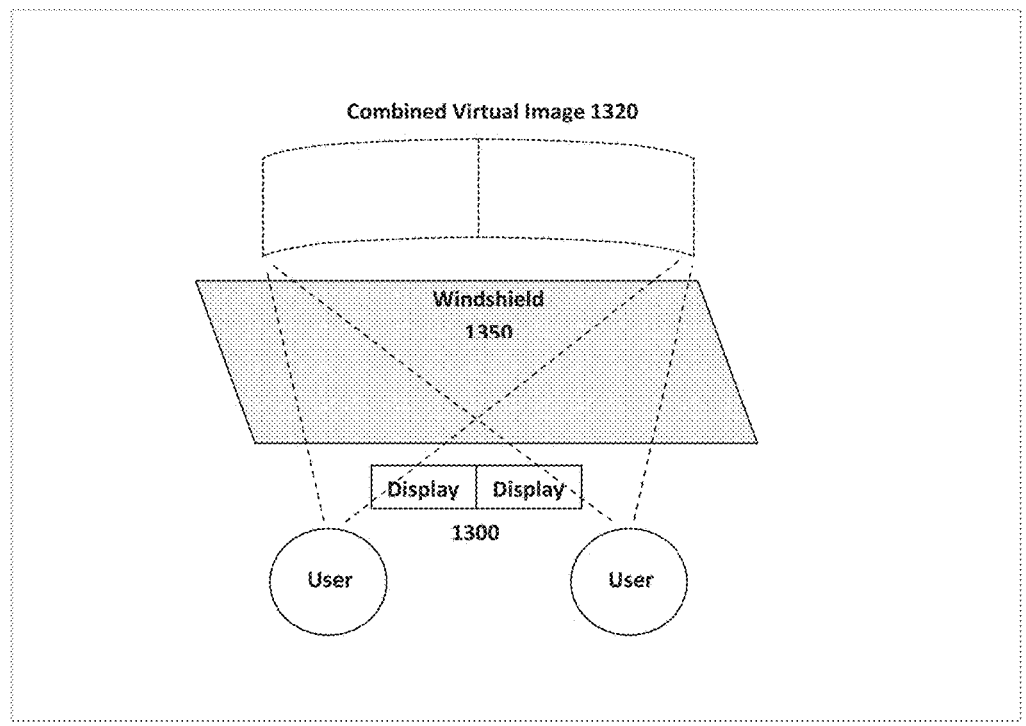
FIG. 13A illustrates an exemplary system where a close up virtual image allows for multiple users to simultaneously view and possibly interact with the same content.
Figure 13B:
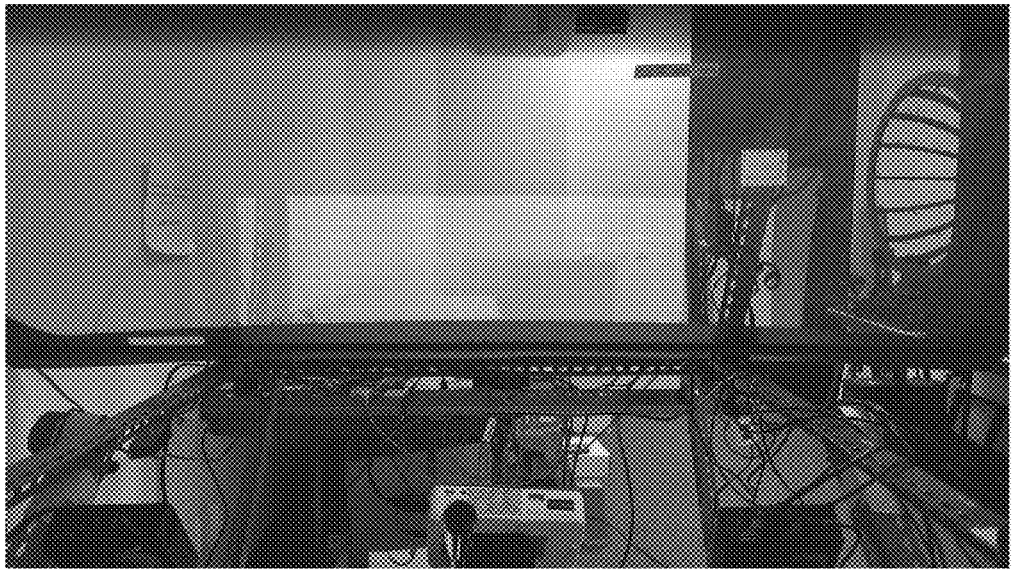
FIGS. 13B and 13C show examples of a combined, blended and corrected virtual image formed by 3 DLP projectors onto a windshield in a lab environment.
Figure 13C:

It may also be envisioned that a large close up virtual display can be used when the vehicle is parked where multiple users can see the combined output of multiple displays, where the projected depth is less than the depth of a typical HUD's virtual image. FIG. 13A shows an exemplary system where the close up virtual image 1320 allows for multiple users to see the same content and enables simultaneous interaction and sharing of the displayed information. When the vehicle is parked, the system may be used to display a large map of the vehicle's surrounding, show a movie or provide infotainment to all passengers in the vehicle. The displays 1300 will correct for the windshield distortion and the un-collimated virtual image allows for a wide viewing angle such that it can be seen by all passengers in the vehicle including those in the rear seats. FIG. 13B shows a combined virtual image formed by 3 projection units onto a windshield in a lab environment where the video feeds from the 3 projection units are blended and corrected for windshield curvature. FIG. 13C shows the case where a large map is displayed on the windshield by combining the virtual images from 3 projection units in a lab environment. The large map maybe augmented by information related to the landmarks or relevant spots in the map.

Figure 14:
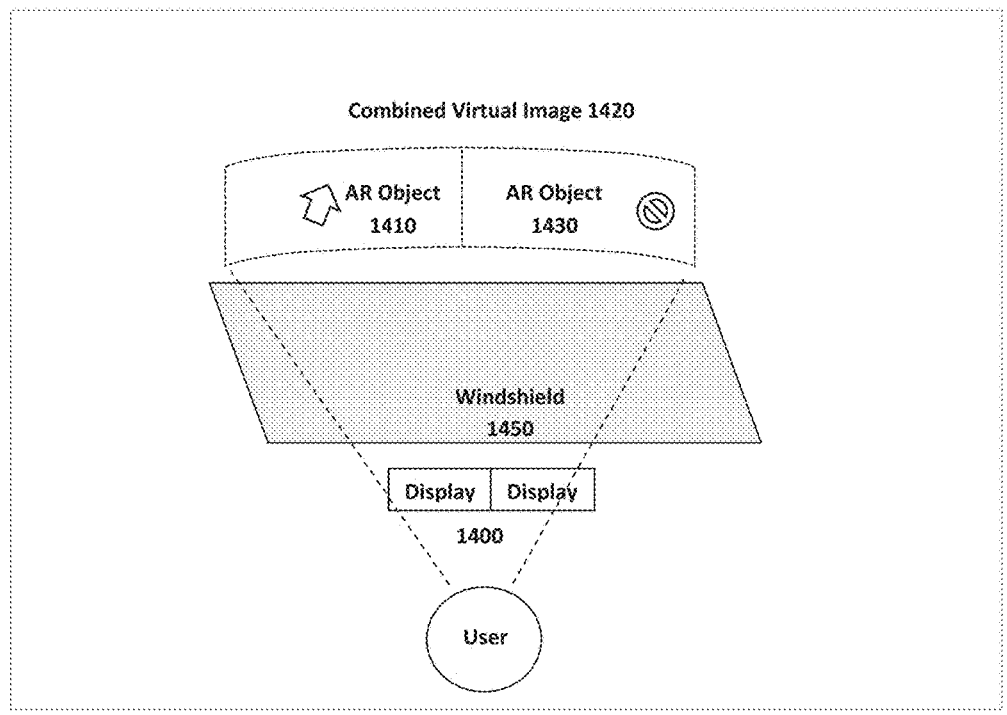
FIG. 14 illustrates an exemplary system of multiple cameras and multiple displays that may enable augmented reality (AR) and image analytics.

FIG. 14 shows a system of multiple cameras and multiple displays that can enable augmented reality (AR) and analytics for the driver. By combining multiple displays 1400 together to form a large virtual surface 1420 that covers the majority of the view of the windshield 1450, the AR objects 1410 and 1430 can be positioned and associated with real world objects as the driver looks out the windshield through the virtual surface. The wide combined virtual surface 1420 enables the AR system the ability to highlight and signal critical information that are to the sides of the vehicle's windshield, and is not limited to highlighting information on the road immediately ahead as a traditional single HUD system. For example, with the wide combined virtual surface, the AR system can mark and highlight a potential hazardous wild animal to the side of the road that maybe attempting to cross in front of the moving vehicle. The UWA distortion corrected feeds from the cameras can also be shown on the displays to enhance the AR experience. The system also has the advantage of decoupling windshield distortion correction handled by the displays 1400, from the placement of the AR objects onto the virtual surface of the displays.

Figure 15:
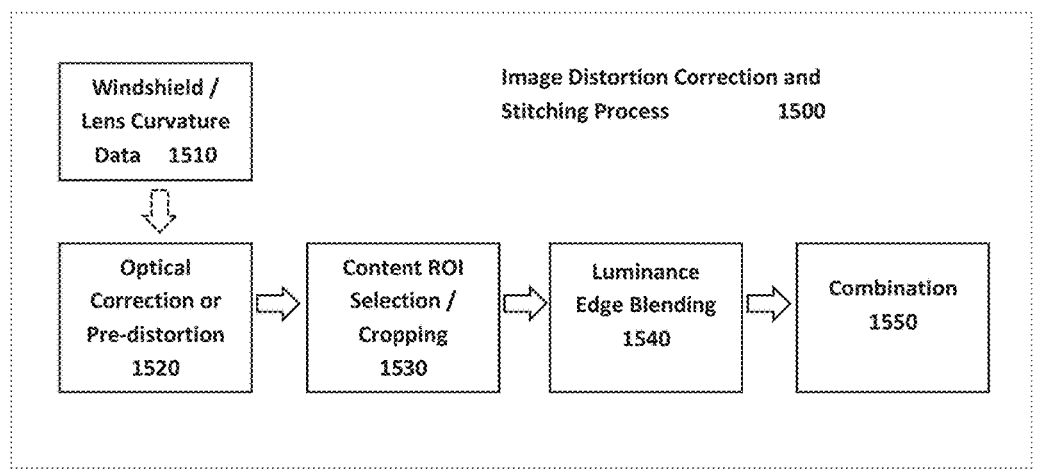
FIG. 15 illustrates an embodied method for correcting for image distortions and combining images from multiple sources.

FIG. 15 shows the processing flow for correcting the windshield distortion for the displays, and stitching together the displays to form a larger combined surface 1500. The flow for stitching multiple displays is very similar to stitching multiple UWA camera feeds for surround view, where the captured or perceived content (a real world scene for the camera or some content for the display) is distorted by the lens' optics or the windshield. Geometric characteristic of lens(es) and the windshield, whether provided or obtained experimentally should be provided as data 1510. This data may also be obtained using a calibration procedure, for example as discussed in the U.S. Pat. Nos. 8,619,248 and 8,768,094. The overall process 1500 can be broken into two main steps, the optical distortion compensation 1520, and the luminance edge blending 1540. An optional content selection step 1530 can be used to scale or crop the content, as well as to split the content across multiple displays. Lastly, 1550 is merely combining the multiple projected images that is inherently done by virtue of the overlapping light envelopes of the multiple projections.

Figure 16A:
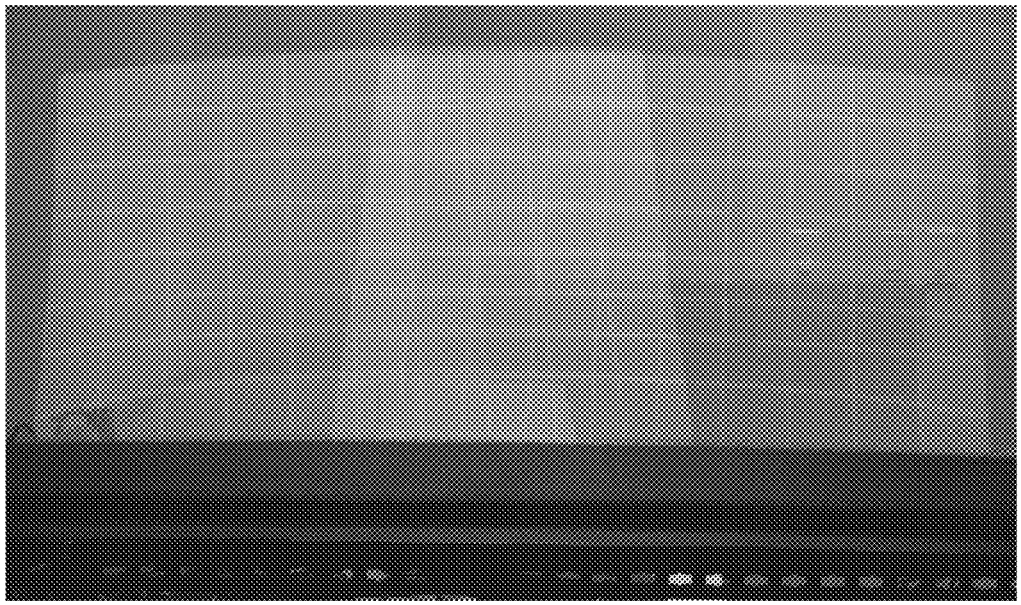
FIGS. 16(A)-16(E) show a lab setup with 2 DLP projectors and a windshield, where no correction is applied (16A), after applying correction for geometric projection distortions (e.g. keystone) and windshield distortion (16B), and after applying edge blending to the left projector (16C) and to the right projector (16D), and finally after combining the edge blended portions (16E).
Figure 16B:
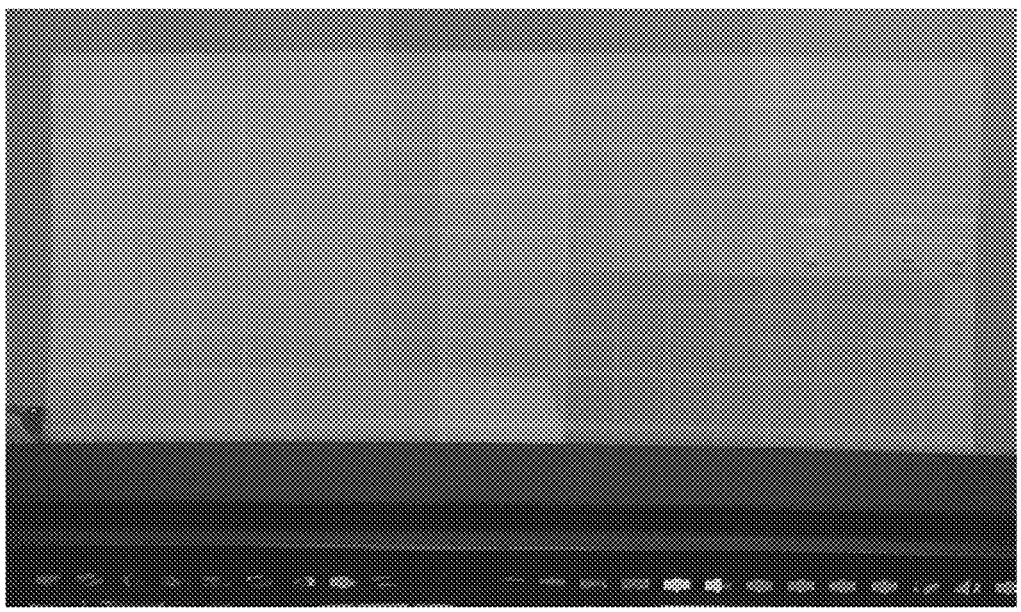
Figure 16C:
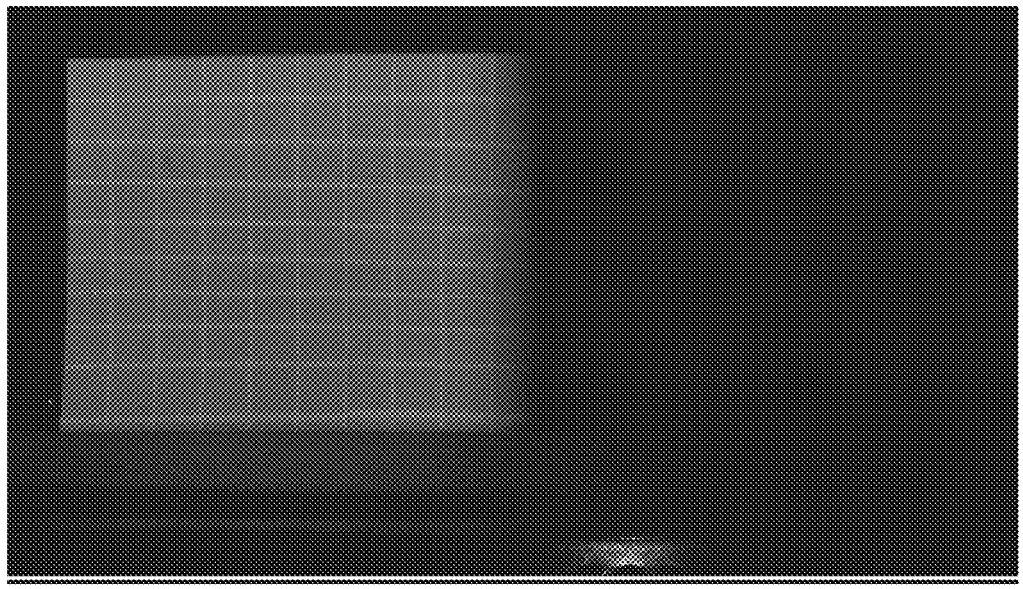
Figure 16D:
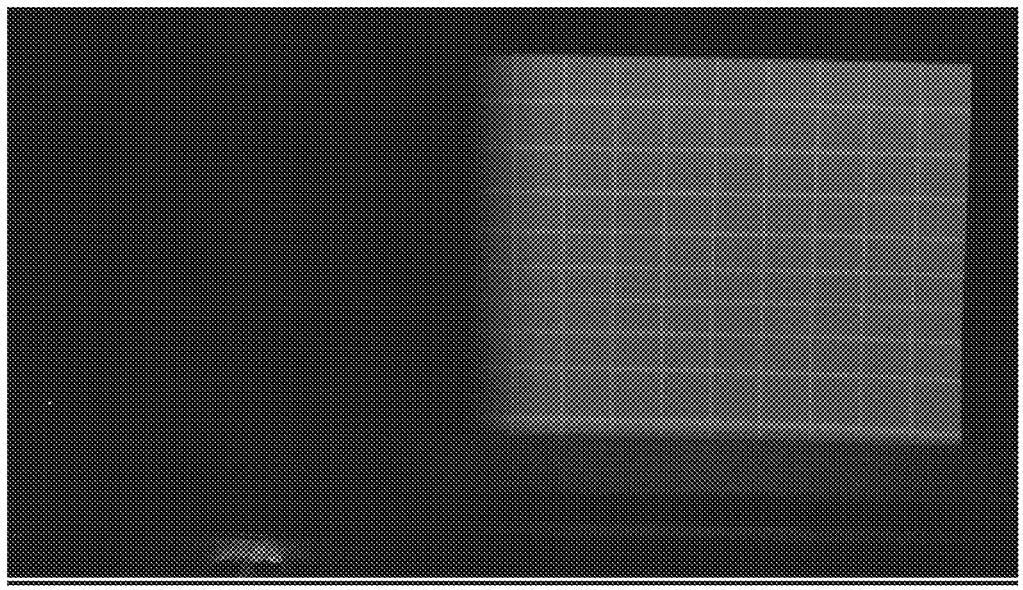
Figure 16E:
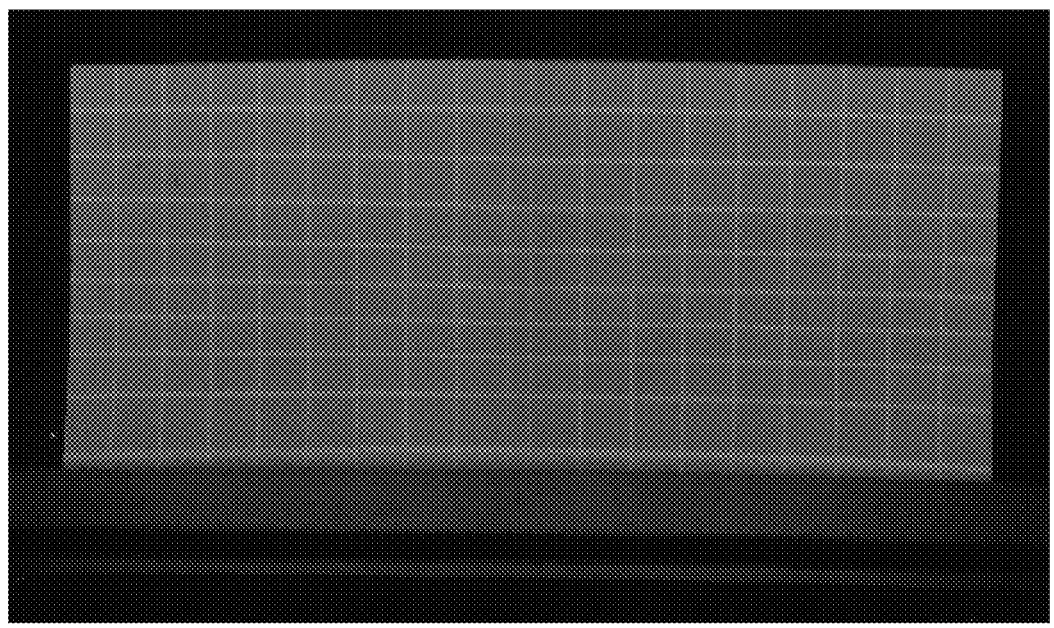

FIG. 16A illustrates a system with two projection units and a windshield, when no correction is applied, resulting in a distorted virtual image with non-uniform luminance in the overlapping regions. FIG. 16B shows the result after applying correction for windshield distortion, where the result is a large seamless stitched virtual image from the multiple displays, however without the edge blending in the overlap. This is analogous to FIG. 6B for cameras, except that the combining is also visible. FIGS. 16C and 16D respectively illustrate application of a smooth edge blending gradient to the left and right projectors, in preparation of their combination. Finally, FIG. 16E shows the result after combining the edge blended portions, which is analogous to the blend applied in FIG. 6C. In FIG. 16E, by virtue of the combined light envelopes, one can see that the final result is a large seamless stitched virtual image from the multiple displays, as would be viewable by a driver.

Implementation of the embodiments of this invention related to visual systems, in particular those of vehicles, may be enabled in preferably in a hardware processor that may be integrated with various capture and/or display components of the system. Alternatively, the embodiments may be implemented in software and applications for a computer-readable medium.

Many variations and combinations of the above taught vision systems with other technologies are possible. The vision system my further include a data storage unit, where segments of the input or output images may be recorded, either upon the driver's command or automatically. If combined with object detection capabilities, the recording may start prior to a possible collision. If combined with communication means, images may be transmitted to authorities.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative of the invention and non-limiting and it will be understood by persons skilled in the art that other variants and modifications may be made without departing from the scope of the invention as defined in the claims appended hereto.

The invention claimed is:

1. A vehicle vision system comprising:
   a plurality of Ultra Wide-Angle (UWA) lens cameras mounted on a plurality of sides of a vehicle, each camera providing a corresponding UWA feed;
   at least one Head-UP-Display (HUD) comprising a Geometry and Color (GCP) processing unit, wherein the at least one HUD is configured to:
      receive at least one UWA feed; and
      pre-process the at least one UWA feed, by applying a plurality of geometry and color transformations to the corresponding UWA feed, in preparation for a seamless surround-view image construction;
   and a central logic configured to combine the pre-processed UWA feeds provided by the corresponding at least one HUD and output a surround-view image of the vehicle;
   wherein at least one of the surround-view output image, one or more of the UWA feeds, and one or more of the transformed UWA feeds are projected on a virtual surface in front of windshield of the vehicle by the at least one HUD.

2. The vehicle vision system of claim 1, wherein one HUD is further configured to command other HUDs, the plurality of cameras and the central logic.

3. The vehicle vision system of claim 1, wherein the central logic comprises a GCP unit.

4. The vehicle vision system of claim 3, wherein the central logic is further configured to command the plurality of cameras and the plurality of HUDs.

5. The vehicle vision system of claim 1, wherein each of the plurality of cameras comprises a GCP unit.

6. The vehicle vision system of claim 5, wherein one camera from the plurality of cameras is further configured to command other cameras, the plurality of HUDs and the central logic.

7. The vehicle vision system of claim 1, wherein the plurality of cameras, the at least one HUD, and the central logic comprise a communication means to communicate with one another via a communication network.

8. The vehicle vision system of claim 1, wherein the GCP pre-processing of the UWA feeds comprises one or more of:
   selecting a viewing perspective in the corresponding UWA feed according to a viewing display mode instruction;
   applying a first transformation to the selected viewing perspective to correct for perspective distortion of the UWA feed;
   applying a second transformation to the perspective corrected UWA feed to correct for windshield distortion and projection geometric distortions; and
   adjusting brightness of the geometric UWA feeds for seamless blending of overlapped image areas.

9. The vehicle vision system of claim 8, wherein the display mode is selected automatically as triggered by changes in driving conditions.

10. The vehicle vision system of claim 8, wherein the display modes is selected manually.

11. The vehicle vision system of claim 8, wherein the display mode is a top-down view.

12. The vehicle vision system of claim 8, wherein the display mode is a panoramic surround-view.

13. The vehicle vision system of claim 1, wherein the virtual images corresponding to different projection units are displayed at different depths relative to windshield.

14. The vehicle vision system of claim 1, wherein the vehicle is mirror-less.

15. The vehicle vision system of claim 1, wherein augmented reality is enabled on the virtual display.

16. A method for displaying a surround-view image of a vehicle, said method comprising:
   receiving a plurality of Ultra Wide-Angle (UWA) feeds, captured by a corresponding plurality of UWA lens cameras mounted on a plurality of sides of the vehicle, by at least one Head-UP-Display (HUD) comprising a Geometry and Color Processing (GCP) unit;
   pre-processing the plurality of received Ultra Wide-Angle (UWA) feeds, by applying a plurality of geometry and color transformations to the corresponding UWA feed, in preparation for a seamless surround-view image construction by the at least one HUD;
   combining the pre-processed UWA feeds, provided by the corresponding at least one HUD, using a central logic to output the surround-view image of the vehicle; and
   projecting at least one of the surround-view output image, one or more of the UWA feeds, and one or more of the pre-processed UWA feeds on a virtual surface in front of windshield of the vehicle through the at least one Head-UP-Display (HUD).

17. The method of claim 16, wherein the plurality of cameras, the at least one HUD, and the central logic comprise a communication means to communicate with one another via a communication network.

18. The method of claim 16, wherein the at least one HUD is configured to command other HUDs, the plurality of cameras and the central logic.

19. The method of claim 16, wherein the central logic comprises a GCP unit.

20. The method of claim 19, wherein the central logic is further configured to command the plurality of cameras and the at least one HUD.

21. The method of claim 16, wherein each camera of the plurality of cameras comprises a GCP unit.

22. The method system of claim 21, wherein one camera from the plurality of cameras is further configured to command other cameras, the at least one HUD and the central logic.

23. The method of claim 16, wherein one camera from the plurality of cameras is configured to command other cameras and the central logic.

24. The method of claim 16, wherein the pre-processing of the UWA feeds is achieved by one or more of:
- selecting a viewing perspective in the correspond UWA feed according to a display mode instruction;
- applying a first transformation to the selected viewing perspective to correct for perspective distortion of the UWA feed;
- applying a second transformation to the perspective corrected UWA feed to correct for windshield distortion and projection geometric distortions; and
- adjusting brightness of the perspective corrected plurality of UWA feeds for seamless blending of overlapped image areas.

25. The method of claim 24, wherein the display mode is selected automatically as triggered by changes in driving conditions.

26. The method of claim 24, wherein the display modes is selected manually.

27. The method of claim 24, wherein the display mode is a top-down surround-view.

28. The method of claim 24, wherein the display mode is a panoramic surround-view.

* * * * *